United States Patent
Guan

(10) Patent No.: US 11,942,863 B2
(45) Date of Patent: Mar. 26, 2024

(54) SWITCHING POWER SUPPLY INCLUDING A LOGIC CIRCUIT TO CONTROL A DISCHARGE CIRCUIT

(71) Applicant: Rohm Co., Ltd., Kyoto (JP)

(72) Inventor: Shidong Guan, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 376 days.

(21) Appl. No.: 17/290,055

(22) PCT Filed: Oct. 28, 2019

(86) PCT No.: PCT/JP2019/042205
§ 371 (c)(1),
(2) Date: Apr. 29, 2021

(87) PCT Pub. No.: WO2020/095748
PCT Pub. Date: May 14, 2020

(65) Prior Publication Data
US 2021/0399637 A1    Dec. 23, 2021

(30) Foreign Application Priority Data

Nov. 5, 2018 (JP) ................................ 2018-208107
Nov. 5, 2018 (JP) ................................ 2018-208110

(51) Int. Cl.
*H02M 3/157* (2006.01)
*H02M 1/00* (2006.01)
(Continued)

(52) U.S. Cl.
CPC ......... *H02M 3/157* (2013.01); *H02M 1/0006* (2021.05); *H02M 1/32* (2013.01); *H02M 1/327* (2021.05); *H02M 1/36* (2013.01)

(58) Field of Classification Search
CPC .... H02M 3/157; H02M 3/156; H02M 1/0006; H02M 1/32; H02M 1/36
See application file for complete search history.

(56) References Cited

U.S. PATENT DOCUMENTS

| 2011/0133711 A1* | 6/2011 | Murakami | H02M 1/32 323/282 |
| 2012/0169309 A1* | 7/2012 | Zhang | H02M 1/32 323/271 |

(Continued)

FOREIGN PATENT DOCUMENTS

| CN | 101834522 A | * 9/2010 |
| CN | 105075088 | 11/2015 |

(Continued)

OTHER PUBLICATIONS

PCT International Search Report in International Appln. No. PCT/JP2019/042205, dated Jan. 7, 2020, 4 pages.

*Primary Examiner* — Kyle J Moody
*Assistant Examiner* — Jye-June Lee
(74) *Attorney, Agent, or Firm* — Fish & Richardson P.C.

(57) ABSTRACT

This switching power supply 1 has: a switch output stage (101, D1, L1, C2) which generates an output voltage Vout by rectifying and smoothing a switch voltage Vsw that is pulse-driven in response to ON/OFF of an output transistor 101; and a discharge circuit 120 which discharges an output voltage Vout when a state in which the output voltage Vout exceeds a target value continues for a period longer than a prescribed time period. For example, the discharge circuit 120 includes a discharge transistor M1 that is connected to and between a voltage application end of the switch voltage Vsw and a grounding end. The discharge transistor M1 is turned ON/OFF periodically or is kept ON continually for discharge of the output voltage Vout.

10 Claims, 18 Drawing Sheets

(51) Int. Cl.
  *H02M 1/32* (2007.01)
  *H02M 1/36* (2007.01)

(56) References Cited

U.S. PATENT DOCUMENTS

| | | | |
|---|---|---|---|
| 2013/0200868 A1* | 8/2013 | Knoedgen | H02M 1/32 323/282 |
| 2014/0266117 A1 | 9/2014 | Goncalves et al. | |
| 2017/0034887 A1* | 2/2017 | Ichikawa | H02M 1/32 |
| 2017/0070149 A1 | 3/2017 | Guan et al. | |
| 2022/0094267 A1* | 3/2022 | Searles | H02M 1/32 |

FOREIGN PATENT DOCUMENTS

| | | |
|---|---|---|
| JP | 2006074973 | 3/2006 |
| JP | 2008067454 | 3/2008 |
| JP | 2009171741 | 7/2009 |
| JP | 2016511629 | 4/2016 |
| JP | 2017060383 | 3/2017 |
| JP | 2018068002 | 4/2018 |
| KR | 20150131116 | 11/2015 |
| WO | WO 2014159935 | 10/2014 |

* cited by examiner

SWITCHING POWER SUPPLY INCLUDING A LOGIC CIRCUIT TO CONTROL A DISCHARGE CIRCUIT

TECHNICAL FIELD

The invention disclosed herein relates to switching power supplies.

BACKGROUND ART

Today, switching power supplies are used in a variety of applications to generate a desired output voltage from an input voltage.

One example of known technology related to what is mentioned just above is seen in Patent Document 1 identified below by the same applicant as the present application.

CITATION LIST

Patent Literature

Patent Document 1: Japanese unexamined patent application publication No. 2008-67454

SUMMARY OF INVENTION

Technical Problem

Inconveniently, known switching power supplies leave room for improvement in terms of load response characteristics or source response characteristics.

In view of the challenge encountered by the present inventor, an object of the invention disclosed herein is to provide a switching power supply with enhanced load response characteristics or source response characteristics.

Solution to Problem

According to one aspect of what is disclosed herein, a switching power supply includes: a switching output stage configured to generate an output voltage by rectifying and smoothing a switching voltage that is pulse-driven as an output transistor is turned on and off; and a discharge circuit configured to discharge the output voltage when the output voltage remains above a target value for a predetermined time.

According to another aspect of what is disclosed herein, a switching power supply includes: a switching output stage configured to generate an output voltage by rectifying and smoothing a switching voltage that is pulse-driven as an output transistor is turned on and off; an oscillation circuit configured to generate an on signal that alternates between an on period and an off period periodically at a predetermined switching frequency; and a logic circuit configured to set the on period of the on signal as the maximum on period of the output transistor. The oscillation circuit is configured to skip the off period of the on signal when, despite the output transistor being kept on for the maximum on period, the output voltage drops below a target value.

Other features, elements, steps, benefits, and characteristics of the present invention will become clear through the following detailed description of embodiments and the accompanying drawings associated therewith.

Advantageous Effects of Invention

According to invention disclosed herein, it is possible to provide a switching power supply with enhanced load response characteristics or source response characteristics.

DESCRIPTION OF EMBODIMENTS

<Switching Power Supply (Overall Configuration)>

Figure 1:
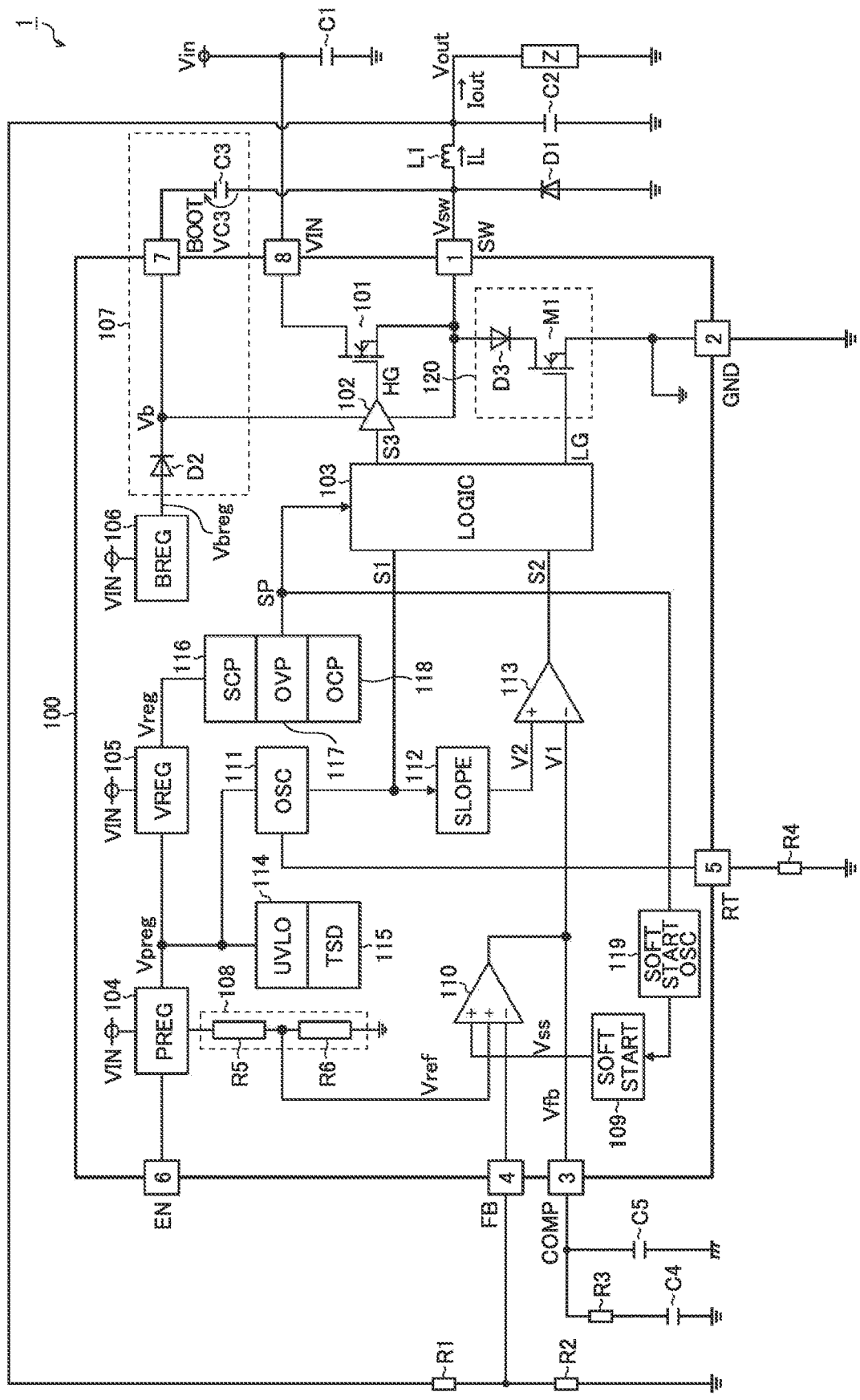
FIG. 1 is a diagram showing an overall configuration of a switching power supply.

FIG. 1 is a diagram showing an overall configuration of a switching power supply. The switching power supply 1 of this configuration example is a bucking (stepping-down) DC-DC converter which bucks (steps down) an input voltage Vin to generate a desired output voltage Vout. The switching power supply 1 includes a semiconductor device 100 and various discreet components externally connected to it (resistors R1 to R4, capacitors C1 to C5, an inductor L1, and a diode D1), The switching power supply 1 is used, for example, as a high-withstand-voltage DC-DC converter for an RRH (remote radio head) which handles transmission and reception of radio signals at a wireless base station.

The semiconductor device 100 is what is called a switching power IC, and is built by integrating together an output transistor 101, a driver circuit 102, a logic circuit 103, a first regulator circuit 104, a second regulator circuit 105, a third regulator circuit 106, a bootstrap circuit 107, a reference voltage generation circuit 108, a soft-start voltage generation circuit 109, an error amplifier circuit 110, an oscillation circuit 111, a slope voltage generation circuit 112, a comparison circuit 113, an undervoltage protection circuit 114, a temperature protection circuit 115, a short-circuit protection circuit 116, an overvoltage protection circuit 117, an overcurrent protection circuit 118, a soft-start oscillation circuit 119, and a discharge circuit 120.

The semiconductor device 100 also has, as a means for establishing electrical connection with outside the device, eight external terminals (pin-1 to pin-8).

Pin-1 (switching terminal SW) is connected to the first terminal of the inductor L1 and to the cathode of the diode. The second terminal of the inductor L1 is connected to an output terminal for the output voltage Vout (i.e., a load Z), to the first terminal of the capacitor C2, and to the first terminal of the resistor R1. The cathode of the diode D1 and the second terminal of the capacitor C2 are connected to a grounded terminal. The second terminal of the resistor R1 is connected to the first terminal of the resistor R2. The second terminal of the resistor R2 is connected to the grounded terminal.

Pin-2 (ground terminal GND) is connected to the grounded terminal.

Pin-3 (phase compensation terminal COMP) is connected to the respective first terminals of the resistor R3 and the capacitor C5. The second terminal of the resistor R3 is connected to the first terminal of the capacitor C4. The respective second terminals of the capacitors C4 an C5 are connected to the grounded terminal.

Pin-4 (feedback terminal FB) is connected to the connection node between the resistors R1 and R2 (i.e., an application terminal for a feedback voltage Vfb). In a case where the output voltage Vout falls within the input dynamic range of pin-4 (FB), the resistors R1 and R2 can be omitted, in which case, as the feedback voltage Vfb, the output voltage Vout can be directly fed to pin-4.

Pin-5 (frequency setting terminal RT) is connected to the first terminal of the resistor R4. The second terminal of the resistor R4 is connected to the grounded terminal.

Pin-6 (enable terminal EN) is connected to an input terminal for an enable signal.

Pin-7 (bootstrap terminal BOOT) is connected to the first terminal of the capacitor C3 (corresponding to a boot capacitor provided in the bootstrap circuit 107). The second terminal of the capacitor C3 is connected to pin-1 (SW).

Pin-8 (power terminal VIN) is connected to an input terminal for the input voltage Vin and to the first terminal of the capacitor C1. The second terminal of the capacitor C1 is connected to the grounded terminal.

Next, the circuit blocks integrated together in the semiconductor device 100 will be described in outline one by one.

The output transistor 101 is an N-channel MOS (metal-oxide-semiconductor) field-effect transistor connected between pin-8 (VIN) and pin-1 (SW). The drain of the output transistor 101 is connected to pin-8 (VIN). The source and the back-gate of the output transistor 101 are both connected to pin-1 (SW). The gate of the output transistor 101 is connected to the output terminal of the driver circuit 102 (i.e., an output terminal for a gate signal HG). The output transistor 101 is on when the gate signal HG is at high level (Vb), and is off when the gate signal HG is at low level (=Vsw).

As the output transistor 101 is turned on and off, a switching voltage Vsw with a rectangular waveform (high level at Vin, low level at GND) appears at pin-1 (SW). The switching voltage Vsw thus pulse-driven is rectified and smoothed with the inductor L1, the diode D1, and the capacitor C2 to generate the output voltage Vout.

Thus, in the switching power supply 1 of this configuration example, the output transistor 101, the diode D1, the inductor L1, and the capacitor C2 constitute a switching output stage that bucks the input voltage Vin to generate a desired output voltage Vout.

The output transistor 101 can be externally connected to the semiconductor device 100. In that case, an external terminal for external output of the gate signal HG is needed. As the output transistor 101, a P-channel MOS field-effect transistor can be used. In that case, the bootstrap circuit 107 is not necessary. As the output transistor 101, an IGBT (insulated-gate bipolar transistor) or the like can be used.

The switching output stage can employ, as its rectification method, synchronous rectification instead of diode rectification.

The switching output stage does not necessarily has to be of a bucking type but may be of a boosting (stepping-up) type, a boost/buck (stepping-up/down) type, or an inverting (negative-output) type.

The driver circuit 102 drives the output transistor 101 in the switching output stage by generating the gate signal HG (high level at Vb, low level at Vsw) by increasing the current capacity of an on/off control signal S3 fed from the logic circuit 103.

In a case where the output transistor 101 is composed of a plurality of unit transistors, the length of, and the parasitic capacitance in, the conductor from the driver circuit 102 to the gate differ among those unit transistors, which are thus turned on and off with varying timing, resulting in disturbances in the driving waveform of the switching voltage Vsw. To cope with this inconvenience, for example, the high-side transistor (i.e., P-channel MOS field-effect transistor) provided in a half-bridge output stage in the driver circuit 102 can be divided into smaller high-side transistors, of which those near the gate can be designed to have a low current capacity and those far away from the gate can be designed to have a high current capacity; this permits the unit transistors constituting the output transistor 101 to be turned on and off with uniform timing, giving the switching voltage Vsw a trimmed driving waveform. This configuration is considered to be particularly effective in a case where a high slew rate is expected in the switching voltage Vsw.

The logic circuit 103 generates the on/off control signal S3 in accordance with an on signal S1 and an off signal S2. Specifically, the logic circuit 103, in response to a pulse edge in the on signal S1, turns the on/off control signal S3 to high level and, in response to a pulse edge in the off signal S2, turns the on/off control signal S3 to low level.

The logic circuit 103 also has a function of forcibly halting the switching operation of the switching output stage (i.e., forcibly turning the on/off control signal S3 to low level) in accordance with a fault protection signal SP.

The logic circuit 103 further has a function of generating a gate signal LG for controlling the discharge circuit 120 (details will be given later).

The first regulator circuit 104 serves as a pre-regulator that generates a first constant voltage Vpreg from the input voltage Vin. The output operation of the first regulator circuit 104 is permitted or inhibited in accordance with an enable signal that is fed in via pin-6 (EN). Specifically, the output operation of the first regulator circuit 104 is permitted when the enable signal is at high level, and is inhibited when the enable signal is at low level.

The second regulator circuit 105 serves as a main regulator that generates a second constant voltage Vreg from the first constant voltage Vpreg. With this two-stage configuration employing a pre-regulator and a main regulator, it is possible to generate a second constant voltage Vreg that is less susceptible to input variation.

The third regulator circuit 106 serves as a bootstrapping regulator that generates a third constant voltage Vbreg from the input voltage Vin.

The bootstrap circuit 107 generates a boosted voltage Vb by use of the capacitor C3, mentioned previously, and a diode D2 incorporated in the semiconductor device 100, and feeds the boosted voltage Vb to the driver circuit 102. The anode of the diode D2 is connected to the output terminal of the third regulator circuit 106 (i.e., an output terminal for the third constant voltage Vbreg). The cathode of the diode D2 (i.e., an application terminal for the boosted voltage Vb) is connected to pin-7 (BOOT).

The operation of the bootstrap circuit 107 will now be described in brief. When the switching voltage Vsw appearing at pin-1 (SW) is at low level (0 V or a negative voltage lower than 0 V), the diode D2 is forward-biased, and thus the capacitor C3 is charged with the third constant voltage Vbreg. Here, the boosted voltage Vb has a voltage value (=Vbreg−Vf) that equals the forward voltage drop across the diode D3 subtracted from the third constant voltage Vbreg.

On the other hand, when the switching voltage Vsw rises from low level (0 V) to high level (Vin), under the law of conservation of charge with respect to the capacitor C3, the boosted voltage Vb too is raised by the same amount as the rise in the switching voltage Vsw. Specifically, the boosted voltage Vb turns to a high voltage (=Vin+Vbreg−Vf) that results from adding up the input voltage Vin and the terminal-to-terminal voltage VC3 (=Vbreg−Vf) across the capacitor C3.

By feeding this boosted voltage Vb to the driver circuit 102, it is possible to make the high level of the gate signal HG higher than the input voltage Vin, and this helps turn on the output transistor 101 without fail.

The reference voltage generation circuit 108 includes resistors R5 and R6 that are connected in series between the output terminal of the first regulator circuit 104 (i.e., an output terminal for the first constant voltage Vpreg) and the grounded terminal, and outputs from the connection node between those resistors a reference voltage Vref (corresponding to a division voltage of the first constant voltage Vpreg).

The soft-start voltage generation circuit 109 generates, at the startup of the switching power supply 1, a soft-start voltage Vss that gently rises with a predetermined gradient.

The error amplifier circuit 110 generates an error voltage V1 in accordance with the difference of the lower of the reference voltage Vref, which is fed to the first non-inverting input terminal (+) of the error amplifier circuit 110, and the soft-start voltage Vss, which is fed to the second non-inverting input terminal (+) of the error amplifier circuit 110 as compared with the feedback voltage Vfb, which is fed to the inverting input terminal (−) of the error amplifier circuit 110. The error voltage V1 rises when the feedback voltage Vfb is lower than the reference voltage Vref (or soft-start voltage Vss), and falls when the feedback voltage Vfb is higher than the reference voltage Vref (or soft-start voltage Vss). To the output terminal of the error amplifier circuit 110, a phase compensation circuit (the capacitors C4 and C5 and the resistor R3) is connected via pin-3 (COMP).

The oscillation circuit 111 operates by being fed with the first constant voltage Vpreg to generate the on signal S1, with a rectangular waveform at a switching frequency fsw. The switching frequency fsw can be controlled by adjusting the resistor R4 externally connected to pin-5 (RT).

The slope voltage generation circuit 112 generates a slope voltage V2, with a sloped waveform (such as a triangular or sawtooth waveform) in synchronization with the on signal S1. The slope voltage generation circuit 112 has a function (slope compensation function) of controlling the gradient of the slope voltage V2 in accordance with the magnitude of an inductor current IL that passes through the switching output stage. With this configuration, it is possible to perform what is called current-mode control, and thereby to enhance the load response of the switching power supply 1.

The comparison circuit 113 generates the off signal S2 by comparing the error voltage V1, which is fed to the inverting input terminal (−) of the comparison circuit 113, with the slope voltage V2, which is fed to the non-inverting input terminal (+) of the comparison circuit 113. The off signal S2 is at low level when the error voltage V1 is higher than the slope voltage V2, and is at high level when the error voltage V1 is lower than the slope voltage V2.

The undervoltage protection circuit 114 monitors the first constant voltage Vpreg and the input voltage Vin to sense an undervoltage fault.

The temperature protection circuit 115 operates by being fed with the first constant voltage Vpreg, and monitors the junction temperature Tj of the semiconductor device 100 to sense a temperature fault.

The short-circuit protection circuit 116 operates by being fed with the second constant voltage Vreg, and monitors, for example, the feedback voltage Vfb to sense a short-circuit fault (e.g., a ground short state in which the output terminal for the output voltage Vout is short-circuited to the grounded terminal or a low-potential terminal comparable to it).

The overvoltage protection circuit 117 operates by being fed with the second constant voltage Vreg, and monitors, for example, the feedback voltage Vfb to sense an overvoltage fault.

The overcurrent protection circuit 118 operates by being fed with the second constant voltage Vreg, and monitors, for example, the switching voltage Vsw to sense an overcurrent that may pass through the switching output stage. The overcurrent protection circuit 118 is of a pulse-by-pulse type that repeats forcible halting and self-recovery of switching operation every switching period.

The soft-start oscillation circuit 119 resets the soft-start voltage Vss to an initial value (0 V) in accordance with the fault protection signal SP.

The discharge circuit 120 is a functional block that discharges the switching voltage Vsw (hence the output voltage Vout) in accordance with the gate signal LG from the logic circuit 103. The discharge circuit 120 includes a discharge transistor M1 (in FIG. 1, an N-channel MOS field-effect transistor) and a diode D3. The anode of the diode D3 is connected to pin-1 (SW). The cathode of the diode D3 is connected to the drain of the discharge transistor M1. The source and the back-gate of the discharge transistor M1 are connected to pin-2 (GND). The gate of the discharge transistor M1 is connected to an application terminal for the gate signal LG. The discharge transistor M1 is on when LG=H (high level), and is off when LG=L (low level). The diode D3 functions as an element for preventing a reverse current from pin-2 (GND) to pin-1 (SW).

Logic Circuit (First Embodiment)

Figure 2:
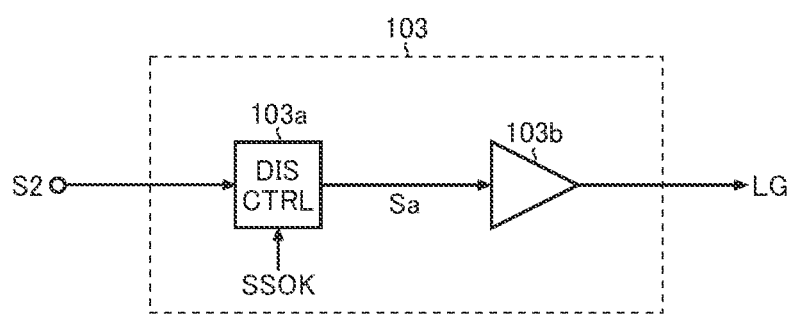
FIG. 2 is a diagram showing a configuration (a first embodiment) of a principal part of a logic circuit.

FIG. 2 is a diagram showing a configuration (first embodiment) of a principal part of the logic circuit 103. The logic circuit 103 of this embodiment includes, as functional blocks involved in the generation of the gate signal LG, a discharge controller 103a and a gate signal driver 103b.

When a soft-start acknowledgement signal SSOK (details will be given later) is at high level and in addition the off signal S2 is kept at high level (the logic level corresponding to an off state) for a predetermined judgment period T1, the discharge controller 103a raises a discharge control signal Sa to high level (the logic level corresponding to an output discharging state).

The gate signal driver 103b drives the discharge transistor M1 in the discharge circuit 120 by generating the gate signal LG by increasing the current capacity of the discharge control signal Sa fed from the discharge controller 103a.

Figure 3:
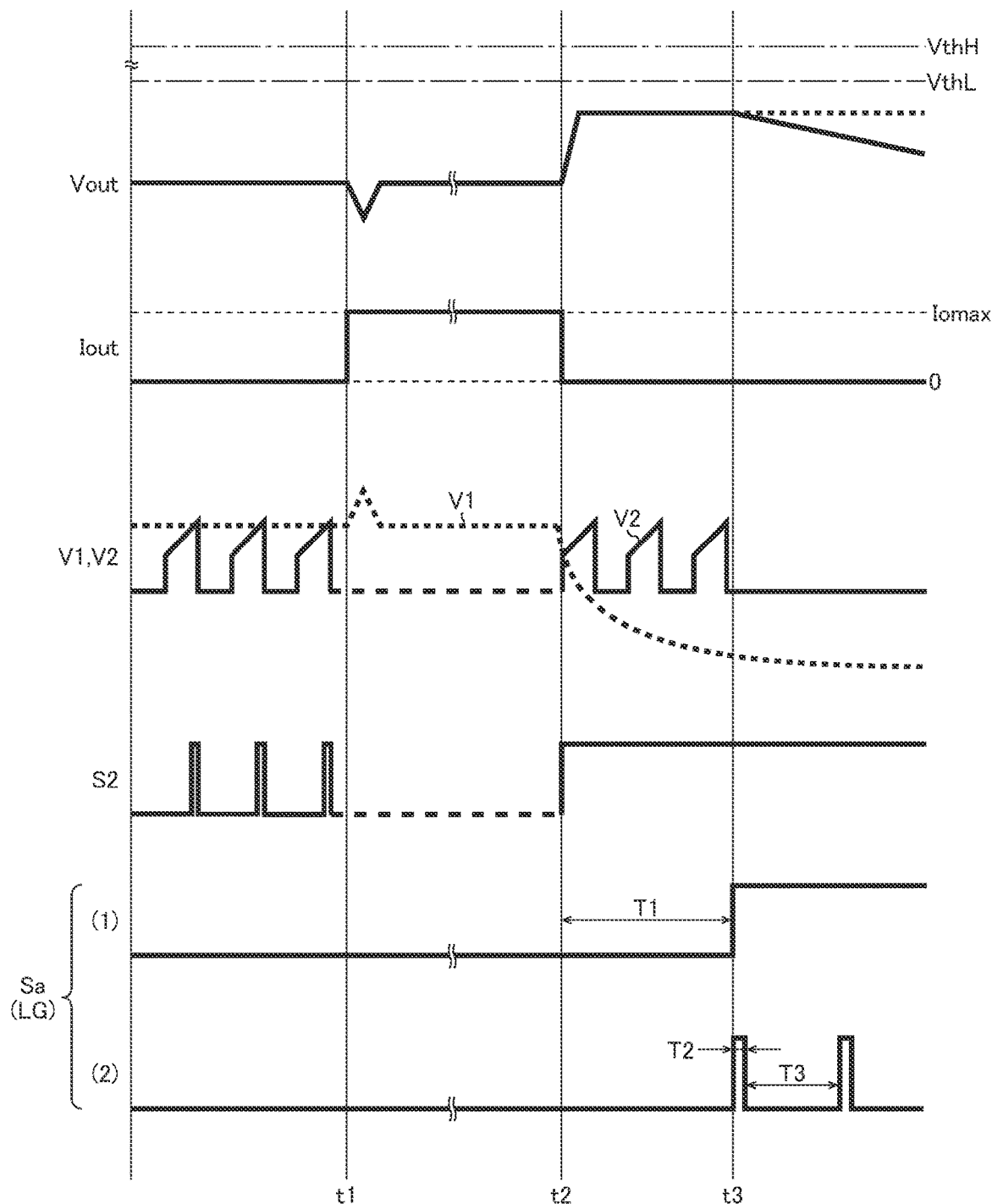
FIG. 3 is a timing chart showing one example of discharge operation in the first embodiment.

FIG. 3 is a timing chart showing one example of discharge operation in the first embodiment, depicting, from top down, the output voltage Vout, the output current Iout that passes through the load Z, the error voltage V1 (broken line) and the slope voltage V2 (solid line), the off signal S2, and the discharge control signal Sa (hence the gate signal LG), For the discharge control signal Sa, (1) a signal waveform it exhibits when the discharge transistor M1 is kept continuously on and (2) a signal waveform it exhibits when the discharge transistor M1 is turned on and off periodically are shown in an upper and a lower tier respectively.

In FIG. 3, at time point t1, the output current Iout increases sharply from zero to the maximum value; then, at time point t2, the output current Iout decreases sharply from the maximum value to zero.

With particular attention paid to time point t2, as the output current Iout decreases sharply, the output voltage Vout rises off the target value, with the result that the error voltage V1 becomes lower than the minimum value (offset value) of the slope voltage V2, and the off signal S2 is kept at high level (the logic level corresponding to an off state). In this state, the output transistor 101 is off, and pin-1 (SW) is left in a high-impedance state. Thus, if the discharge circuit 120 were not provided, the output voltage Vout would take some time to fall down to the target value (see the broken-line part of the output voltage Vout).

On the other hand, in this embodiment, after the off signal S2 rises to high level, when the predetermined judgment time T1 (e.g., T1>1/fsw) elapses, that is, at time point t3, the discharge control signal Sa (hence the gate signal LG) is raised to high level. This turns on the discharge transistor M1, and thus a discharge passage conducts from pin-1 (SW) via the diode D3 and the discharge transistor M1 to pin-2 (CND), permitting the output voltage Vout to be discharged quickly.

Incidentally, the output discharge control described above is nothing less than operation of, when the output voltage Vout has remained higher than the target value for the predetermined judgment period T1, turning on the discharge transistor M1 to discharge the output voltage Vout.

With this configuration, where output discharge control is performed on sensing the off signal S2 having remained at high level, it is possible to use the comparison circuit 113, which is provided for PWM (pulse width modulation) driving of the output transistor 101, also for output discharge control, and this helps avoid an unnecessary increase in circuit scale.

When the discharge transistor M1 is turned on, S2=H, and thus the output transistor 101 is necessarily off. Accordingly, the output transistor 101 and the discharge transistor M1 do not happen to be simultaneously on, and this eliminates the need for complicated deadtime control.

Too large a time constant τ in the phase compensation circuit (C4, CS, R3), which is externally connected to pin-3 (COMP), causes the error voltage V1 to take a long time to become lower than the minimum value (offset value) of the slope voltage V2. This results in the off signal S2 taking some time to come to be kept at high level, and delays the discharging of the output voltage Vout. To avoid that, the time constant τ of the phase compensation circuit (C4, C5, R3) is preferably adjusted within a range adequate for both phase compensation and output discharge control.

The discharge transistor M1 may be kept on continuously starting at time point t3, or may be turned on and off periodically so as to repeat an on period 12 (e.g., 500 ns) and an off period T3 (e.g., 4 μs). A configuration is also possible that permits, as necessary, choice between a first discharge mode in which the discharge transistor M1 is kept continuously on starting at time point t3 and a second discharge mode in which the discharge transistor M1 is turned on and off periodically. In a case where the discharge transistor M1 is turned on and off periodically, for example, the on period T2 and the off period T3 may each be controlled to be variable in accordance with how much of the output voltage Vout is to be discharged.

Though not shown in FIG. 3, as the discharging of the output voltage Vout proceeds, when the error voltage V1 becomes higher than the minimum value (offset value) of the slope voltage V2 and as a result the off signal S2 falls to low level, the counting of the judgment period T1 is reset and the discharge control signal Sa (hence the gate signal LG) is dropped to low level; thus the discharge transistor M1 is turned off. Thereafter, when a pulse appears in the off signal S2, the output transistor 101 turns on, and the switching power supply 1 returns to normal operation.

Also when the output voltage Vout rises owing to a factor other than load variation, if the off signal S2 is kept at high level for the predetermined judgment period T1, output discharge control similar to that described above is performed. In view of this, the output discharge control described above can be understood as a kind of overvoltage protection function.

Next, a case will be studied where, during the startup or operation of the switching power supply 1, pin-1 (SW), for instance, suffers a power short (a short circuit to an application terminal for the input voltage Vin or a high-potential terminal comparable to it). In this case, the feedback voltage Vfb all the time remains higher than the reference voltage Vref; thus the error voltage V1 is lower than the minimum value (offset value) of the slope voltage V2, and the off signal S2 is kept at high level. As a result, through the output discharge control described previously, the discharge transistor M1 turns on.

Here, if the discharge transistor M1 is kept on continuously, a high current keeps passing through the discharge transistor M1, and the discharge transistor M1 may generate so much heat as to break down. To avoid that, the discharge transistor M1 is preferably turned on and off periodically.

When, as a result of a power short of pin-1 (SW), the feedback voltage Vfb becomes higher than an overvoltage sense threshold value VthL (e.g., VthL=Vref×1.2), the overvoltage protection circuit 117 forcibly turns off the output transistor 101. Here, from the perspective of protecting the discharge transistor M1, it may appear appropriate to forcibly turn off the discharge transistor M1 as well. However, such a mode of protection may, depending on how the overvoltage sense threshold value VthL is set, hamper proper functioning of the previously described output discharge control during load variation. It may also affect the charging operation for the capacitor C3 provided in the bootstrap circuit 107.

To circumvent such glitches, it is preferable to set, separately from the ordinary overvoltage sense threshold value VthL, a higher power-short sense threshold value VthH (e.g., VthH=Vref×2.0) so that, when Vth≤Vfb<VthH, only the output transistor 101 is forcibly turned off and, when Vfb≥VthH, both the output transistor 101 and the discharge transistor M1 are forcibly turned off.

Figure 4:
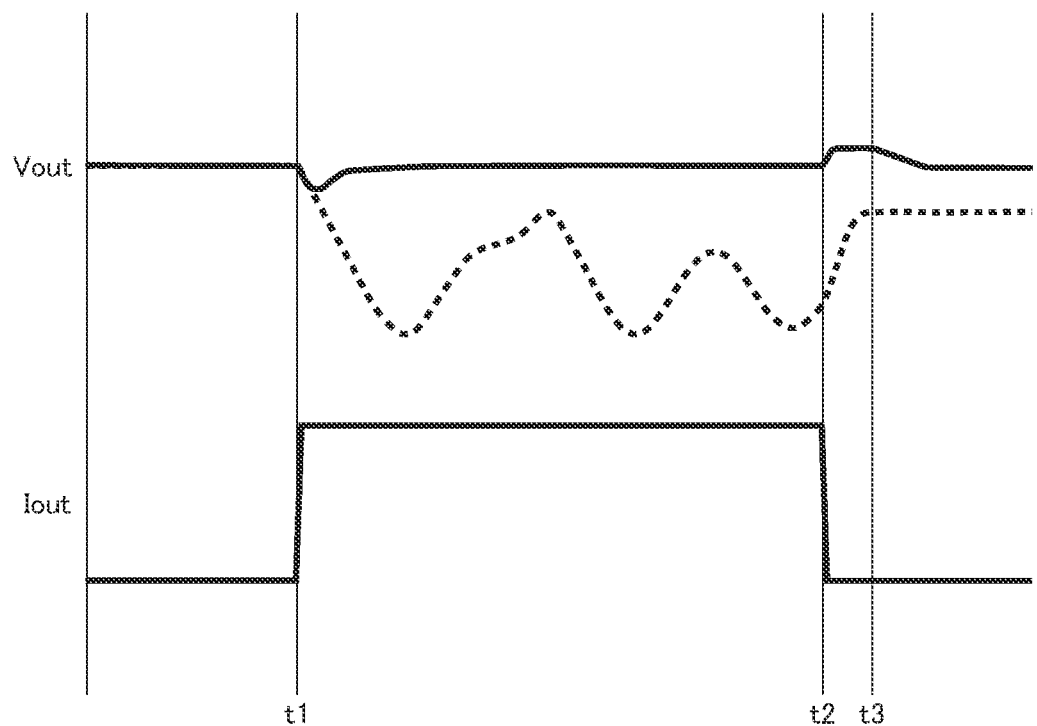
FIG. 4 is a diagram showing how load response characteristics are improved.

FIG. 4 is a diagram showing how load response characteristics are improved, depicting, from top down, the output voltage Vout (solid line, with the discharge circuit; broken line, with without the discharge circuit) and the output current Iout. Time points t1 to t3 in FIG. 3 correspond to those in FIG. 4.

Figure 5:
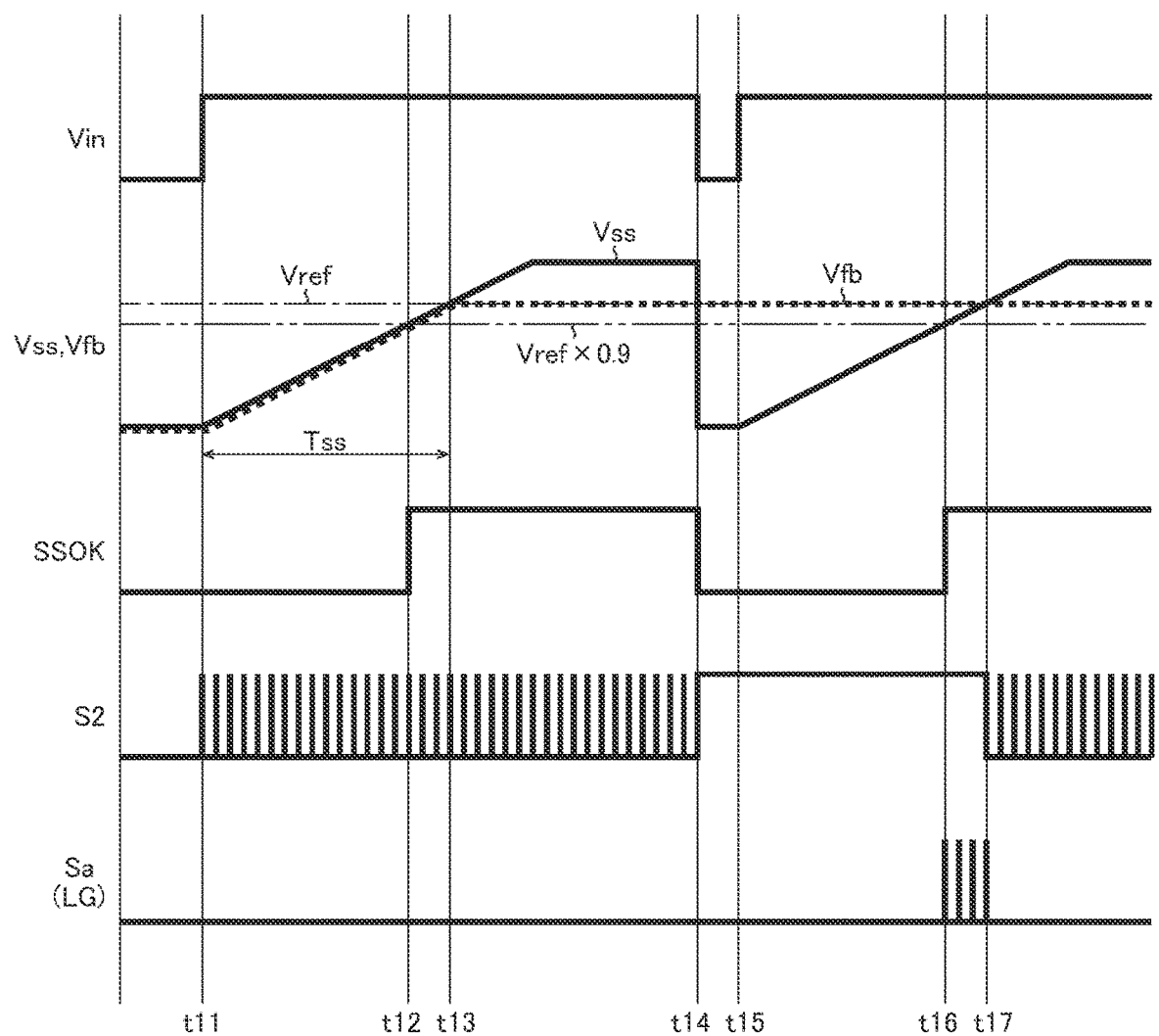
FIG. 5 is a timing chart showing one example of discharge operation on occurrence of a momentary power interruption.

As shown in FIG. 4, introducing the discharge circuit 120 brings a great improvement in the load response characteristics of the switching power supply 1. It has also been confirmed that the output voltage Vout settles more quickly. An improvement is also observed in the response characteristics with respect to continuous load variation, FIG. 5 is a timing chart showing one example of discharge operation on occurrence of a momentary power interruption of the input voltage Vin, depicting, from top down, the input voltage Yin, the soft-start voltage Vss (solid line) and the Feedback voltage Vfb (broken line), the soft-start acknowledgement signal SSOK, the off signal S2, and the discharge control signal Sa (hence the gate signal LG).

When, at time point t11, the input voltage Vin starts to be supplied and the switching power supply 1 starts up, the soft-start voltage Vss (solid line) starts to rise from 0 V with a predetermined gradient. Accordingly, during the soft-start period Tss (between time points t11 and t13), in which the soft-start voltage Vss is lower than the reference voltage Vref, an error voltage V1 (hence the off signal S2) commensurate with the difference between the feedback voltage Vfb (broken line) and the soft-start voltage Vss (solid line) is generated, and based on this difference, the output transistor 101 is PWM-driven (driven through pulse width modulation).

The time point at which the error voltage V1 and slope voltage V2 cross each other (i.e., the time point at which a pulse appears in the off signal S2) is later the higher the error voltage V1, and is earlier the lower the error voltage V1. In other words, the on period Ton of the output transistor 101 is longer the higher the error voltage V1, and is shorter the lower the error voltage V1. In this way, in the switching power supply 1, the on-duty Don of the output transistor 101 (i.e., the proportion of the on period Ton in the switching period T, Don=Ton/T) is determined in accordance with the error voltage V1, and thereby the desired output voltage Vout is generated from the input voltage Vin.

As mentioned previously, during the soft-start period Tss, the error voltage V1 is generated in accordance with the difference between the soft-start voltage Vss, which rises gently from 0 V, and the feedback voltage Vfb. Thus, the switching power supply 1 starts up with the error voltage V1 sufficiently low. Accordingly, the on-duty Don of the output transistor 101 increases gradually from its minimum value, and this helps prevent a rush current through the capacitor C3 or through the load.

The gradient of the soft-start voltage Vss can be set appropriately such that the soft-start period Tss has the desired length. The soft-start voltage Vss eventually rises up to a voltage value higher than the reference voltage Vref.

The switching power supply 1 has introduced in it a soft-start acknowledgement signal SSOK that indicates whether the soft-start voltage Vss has reached the reference voltage Vref or a value around it (in FIG. 5, Vref×0.9). In terms of what is shown in FIG. 5, the soft-start acknowledgement signal SSOK rises from low level to high level at time point t12, when Vss becomes higher than (>) Vref×0.9.

As shown FIG. 2 referred to previously, the soft-start acknowledgement signal SSOK is fed to the discharge controller 103a in the logic circuit 103; even when the off signal S2 is kept at high level, unless the soft-start acknowledgement signal SSOK has not risen to high level, the counting of the judgment period T1 does not start. Now the significance of introducing the soft-start acknowledgement signal SSOK will be discussed in detail.

If a momentary power interruption (momentary power failure) occurs in the input voltage Vin between time points t14 and t15, the soft-start voltage Vss is reset to 0 V through undervoltage protection operation and then starts to rise again gently with a predetermined gradient. On the other hand, the output voltage Vout (hence the feedback voltage Vfb), owing to the capacitor C2 holding electrical charge, hardly drops even after time point t14 and remains at the voltage value it has had until then. Accordingly, after the momentary power interruption in the input voltage Vin is eliminated, the switching power supply 1 restarts with the feedback voltage Vfb higher than the soft-start voltage Vss (i.e., in a pre-biased state).

Meanwhile, when the error voltage V1 falls down to a voltage value lower than the minimum value (offset value) of the slope voltage V2, the off signal S2 comes to be kept at high level. Accordingly, if the soft-start acknowledgement signal SSOK were not introduced, the discharge control signal Sa (hence the gate signal LG) would rise to high level during the restarting of the switching power supply 1, and thus the output voltage Vout would be discharged unnecessarily.

In contrast, with the configuration where the off signal S2 remaining at high level is ignored until the soft-start acknowledgement signal SSOK rises to high level during the period (between time points t14 and t16) in which, due to an momentary power interruption in the input voltage Vin, the soft-start acknowledgement signal SSOK has fallen to low level, the discharge control signal Sa (hence the gate signal LG) is not ever raised to high level, and this helps prevent unintended discharging of the output voltage Vout.

When, at time point t16, Vss becomes higher than (>) Vref×0.9 and the soft-start acknowledgement signal SSOK rises to high level, then, when the off signal S2 has thereafter been kept at high level for a predetermined judgment period T1, the discharge control signal Sa (hence the gate signal LG) rises to high level, and the discharging of the output voltage Vout is started. This discharge operation with respect to the output voltage Vout is continued until the off signal S2 ceases to remain at high level.

Incidentally, during the restarting of the switching power supply 1 resulting from a momentary power interruption in the input voltage Vin, the period in which the output voltage Vout is discharged (i.e., between time points t16 and t17) is very short. To suppress as effectively as possible a drop in the output voltage Vout during that period, it is preferable, instead of keeping the discharge transistor M1 continuously on, to turn the discharge transistor M1 on and off periodically by pulse-driving the discharge control signal Sa (hence the gate signal LG) as illustrated in FIG. 5.

Logic Circuit (Second Embodiment)

Figure 6:
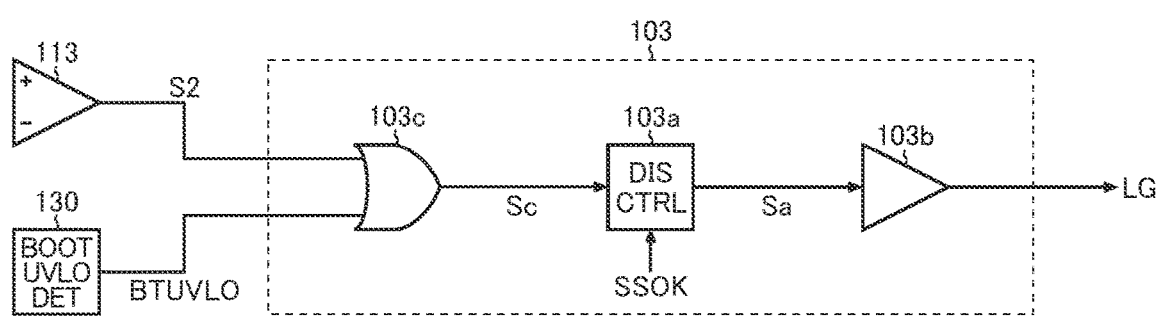
FIG. 6 is a diagram showing a configuration (a second embodiment) of a principal part of a logic circuit.

FIG. 6 is a diagram showing a configuration (second embodiment) of a principal part of the logic circuit 103. The logic circuit 103 of this embodiment additionally includes, in a stage preceding the discharge controller 103a, an OR operator 103c.

The OR operator 103c generates an OR signal Sc by an OR operation between the off signal S2 fed from the comparison circuit 113 and a boot fault signal BTUVLO fed from a boot fault sense circuit 130, and feeds the OR signal Sc to the discharge controller 103a. The OR signal Sc is at high level when at least one of the off signal S2 and the boot fault signal BTUVLO is at high level, and is at low level when the off signal S2 and the boot fault signal BTUVLO are both at low level.

The boot fault sense circuit 130 generates the boot fault signal BTUVLO by sensing whether the terminal-to-terminal voltage VC3 across the capacitor C3 exhibits a drop. The boot fault signal BTUVLO is at high level on sensing a fault, and is at low level otherwise.

The discharge controller 103a receives the OR signal Sc instead of the off signal S2, and raises the discharge control signal Sa to high level (the logic level corresponding to an output discharging state) when the soft-start acknowledgement signal SSOK is at high level and in addition the OR signal Sc has been kept at high level for the predetermined judgment period T1.

Thus, the discharge controller 103a raises the discharge control signal Sa to high level not only when the off signal S2 has been kept at high level (the logic level corresponding to an off state) for the judgment period T1 but also when the hoot fault signal BTUVLO has been kept at high level (the logic level corresponding to a fault being sensed) for the judgment period T1.

Figure 7:
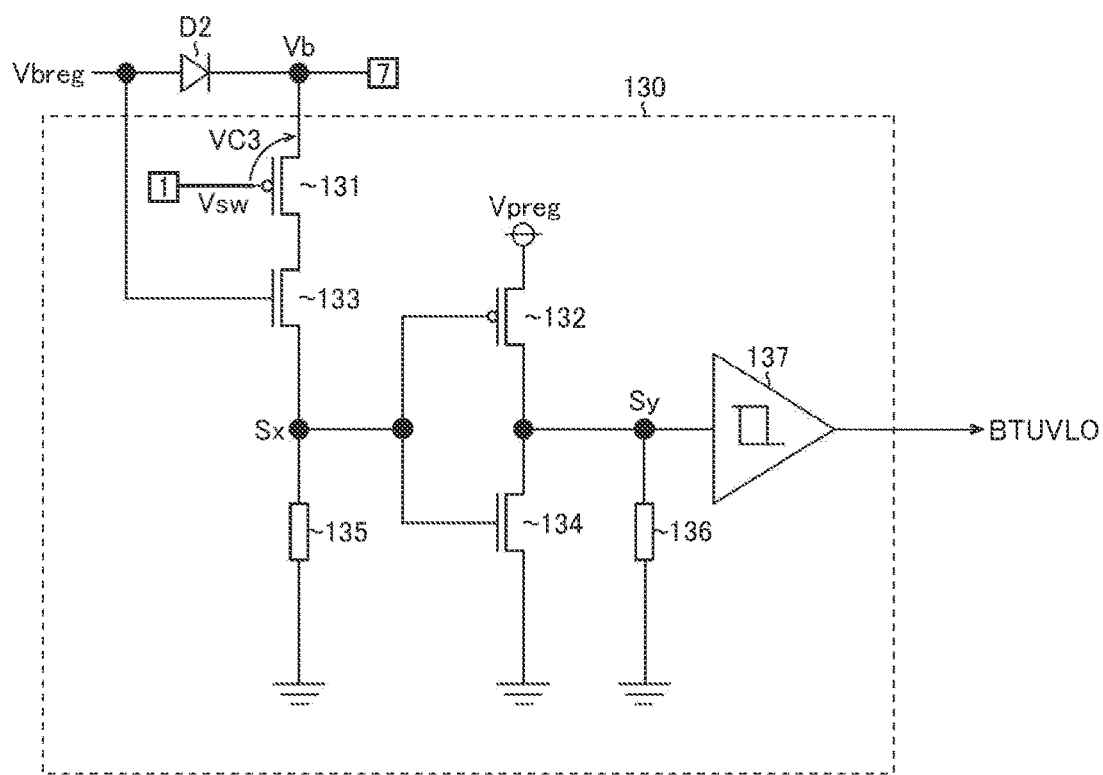
FIG. 7 is a diagram showing one example of the configuration of a boot fault sense circuit.

FIG. 7 is a diagram showing one example of the configuration of the boot fault sense circuit 130. The boot fault sense circuit 130 of this configuration example includes P-channel MOS field-effect transistors 131 and 132. N-channel MOS field-effect transistors 133 and 134, resistors 135 and 136, and a Schmitt buffer 137.

The source of the transistor 131 is connected to an application terminal for the boosted voltage Vb (i.e., pin-7 (BOOT)), the gate of the transistor 131 is connected to an application terminal for the switching voltage Vsw (i.e., pin-1 (SW)). Thus, the transistor 131 receives, between its gate and source, the terminal-to-terminal voltage VC3 (=Vb−Vsw) of the capacitor C3.

The drain of the transistor 133 is connected to the drain of the transistor 131. The gate of the transistor 133 is connected to an application terminal for the third constant voltage Vbreg. The source of the transistor 133 is connected to the first terminal of the resistor 135 (i.e., an output terminal for a logic signal Sx). The second terminal of the resistor 135 is connected to the grounded terminal. So connected, the transistor 133 functions as a damper that limits the drain-source voltage of the transistor 131 at or under a predetermined upper-limit value. The resistor 135 is preferably given a sufficiently high resistance value to keep low the driving current that passes through the boot fault sense circuit 130.

The source of the transistor 132 is connected to an application terminal for the first constant voltage Vpreg (i.e., an internal supply voltage that is the first to rise and the last to fall within the semiconductor device 100). The respective gates of the transistors 132 and 134 are connected to the first terminal of the resistor 135. The respective drains of the transistors 132 and 134 are connected to the first terminal of the resistor 136. The source of the transistor 134 and the second terminal of the resistor 136 are connected to the grounded terminal. So connected, the transistors 132 and 134 function as a CMOS inverter that logically inverts the logic signal Sx to generate a logic signal Sy (or SxB). The resistor 136 functions as a logic level fixing resistor (i.e., pull-down resistor).

The Schmitt buffer 137 functions as an output stage of the boot fault sense circuit 130, and outputs the logic signal Sy as the boot limit signal BTUVLO.

In the boat fault sense circuit 130 of this configuration example, when the terminal-to-terminal voltage VC3 across the capacitor C3 is higher than a predetermined threshold voltage Vth (corresponding to the on-threshold voltage of the transistor 131; e.g., 2.5 V), the transistor 131 is on, and thus the logic signal Sx is at high level. Accordingly, the logic signal Sy is at low level, and thus the boot fault signal BTUVLO too is at low level (the logic level corresponding to no fault being sensed).

On the other hand, when the terminal-to-terminal voltage VC3 across the capacitor C3 is lower than the threshold voltage Vth, the transistor 131 is off, and thus the logic signal Sx is at low level. Accordingly, the logic signal Sy is at high level, and thus the boot fault signal BTUVLO too is at high level (the logic level corresponding to a fault being sensed).

Figure 8:
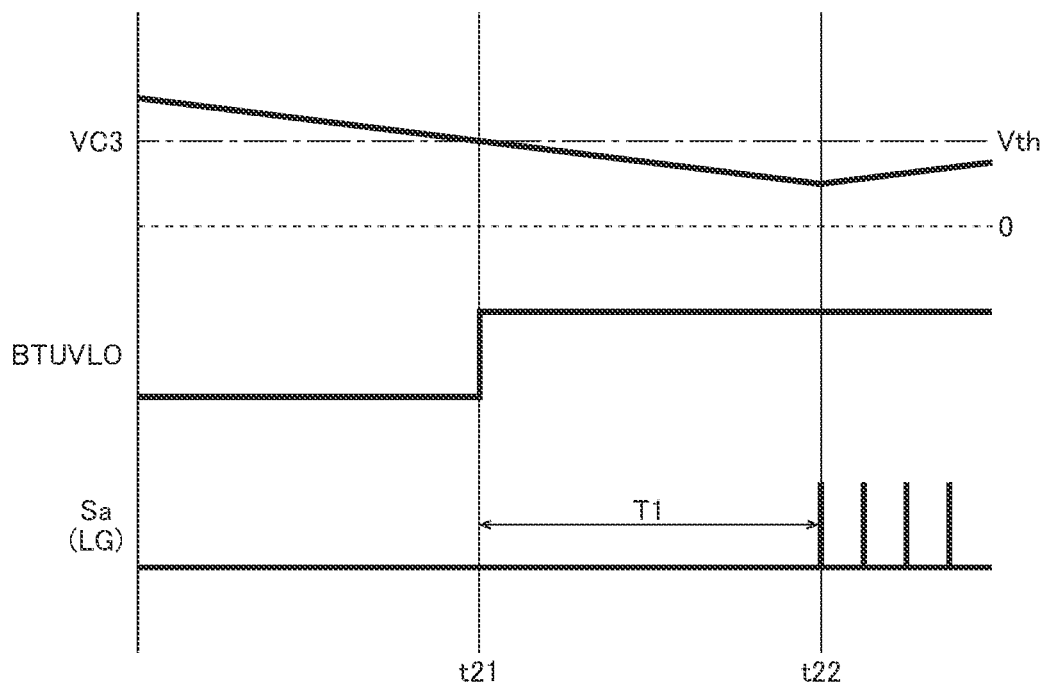
FIG. 8 is a timing chart showing one example of discharge operation in the second embodiment.

FIG. 8 is a timing chart showing one example of discharge operation in the second embodiment, depicting, from top down, the terminal-to-terminal voltage VC (=Vb−Vsw) across the capacitor C3, the boot fault signal BTUVLO, and the discharge control signal Sa (hence the gate signal LG).

Before time point t21, the terminal-to-terminal voltage VC3 is higher than the threshold voltage Vth, and thus the boot fault signal BTUVLO is at low level (the logic level corresponding to no fault being sensed). Accordingly, the discharge control signal Sa (hence the gate signal LG) is kept at low level.

At time point t21, if some fault causes the terminal-to-terminal voltage VC3 to drop below the threshold voltage Vth, the boot fault signal BTUVLO rises from low level to high level (the logic level corresponding to a fault being sensed). Even so, at this point, since the judgment period T1 has not yet passed, the discharge control signal Sa (hence the gate signal LG) continues to remain at low level.

If thereafter the terminal-to-terminal voltage VC3 does not return to or above the threshold voltage Vth and the boot fault signal BTUVLO is kept at high level for the judgment period T1, then, at time point t22, the discharge control signal Sa (hence the gate signal LG) is raised to high level. As a result, the discharge transistor M1 is turned on, and the output discharge control described previously is performed. Here, pin-1 (SW) remains approximately at the ground voltage (0 V); thus the capacitor C3 is charged and the terminal-to-terminal voltage VC3 across it rises.

Incidentally, on sensing a boot fault, it is preferable, instead of keeping the discharge transistor M1 continuously on, to turn on and off the discharge transistor M1 periodically by pulse-driving the discharge control signal Sa (hence the gate signal LG) as shown in FIG. 8.

The sense threshold voltage and the recovery threshold voltage in the boot fault sense circuit 130 are preferably given hysteresis (e.g., sense threshold voltage, 2.5 V; recovery threshold voltage, 3.0 V).

Logic Circuit (Third Embodiment)

Figure 9:
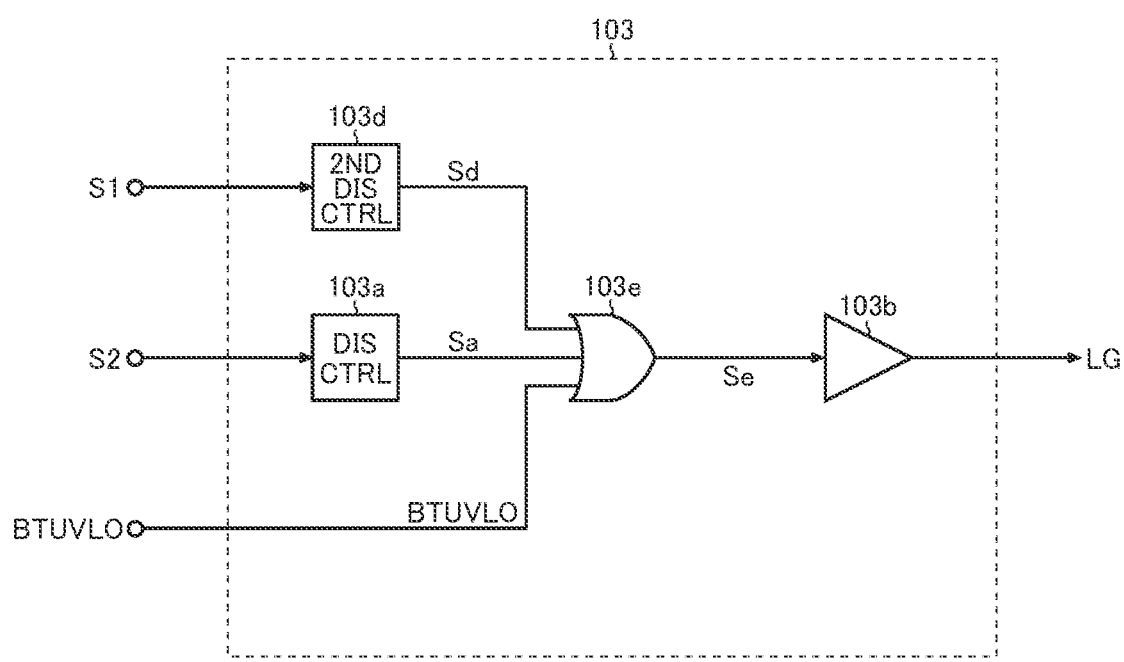
FIG. 9 is a diagram showing a configuration (a third embodiment) of a principal part of a logic circuit.

FIG. 9 is a diagram showing a configuration (third embodiment) of a principal part of the logic circuit 103. The logic circuit 103 of this embodiment includes, in addition to the discharge controller 103a and the gate signal driver 103b already described, a second discharge controller 103d and an OR operator 103e.

The second discharge controller 103d receives the on signal S1, and generates pulses periodically in a second discharge control signal Sd (details will be given later).

The OR operator 103e receives the discharge control signal Sa, the second discharge control signal Sd, and the boot fault signal BTUVLO, generates an OR signal Se by an OR operation among those signals, and outputs the OR signal Se to the gate signal driver 103b. The OR signal Se is at high level when at least one of the discharge control signal Sa, the second discharge control signal Sd, and the boot fault signal BTUVLO is at high level, and is at low level when the discharge control signal Sa, the second discharge control signal Sd, and the boot fault signal BTUVLO are all at low level.

The gate signal driver 103b drives the discharge transistor M1 in the discharge circuit 120 by generating the gate signal LG by increasing the current capacity of the OR signal Se fed instead of the discharge control signal Sa to the gate signal driver 103b.

Figure 10:
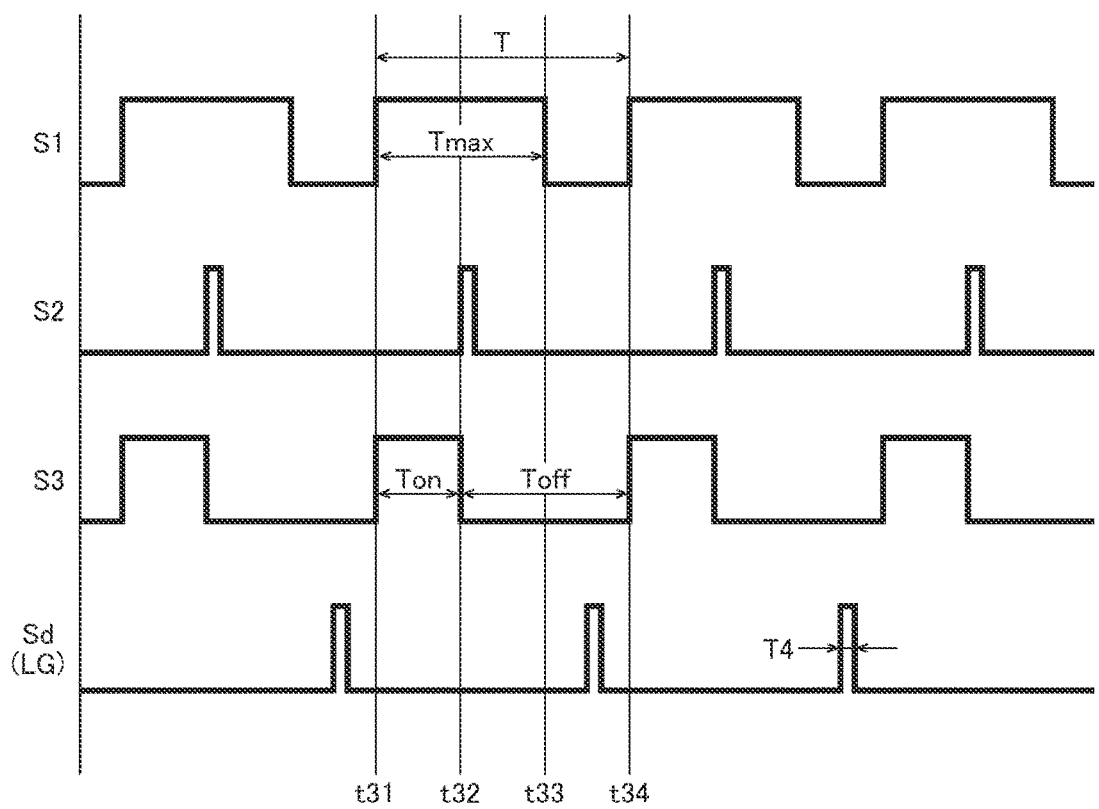
FIG. 10 is a timing chart showing one example of discharge operation in the third embodiment.

FIG. 10 is a timing chart showing one example of discharge operation in the third embodiment, depicting, from top down, the on signal S1, the off signal S2, the on/off control signal S3, and the second discharge control signal Sd.

Basically the on/off control signal S3 rises to high level when the on signal S1 rises (e.g., at time points t31 and t34), and falls to low level when the off signal S2 rises (e.g., at time point t32).

Accordingly, the period between time points t31 and t34 corresponds to the switching period T (=1/fsw) of the output transistor 101. The period between time points t31 and t32 corresponds to the on period Ton of the output transistor 101, and the period between time points t32 and t34 corresponds to the off period Toff of the output transistor 101.

Though not specifically shown in FIG. 10, even when no pulse is generated in the off signal S2, the on/off control signal S3 forcibly falls to low level when the on signal S1 falls (e.g., at time point t33).

Accordingly, the period between time points t31 and t33 corresponds to the maximum on period Tmax of the output transistor 101. Put from another viewpoint, at least the period between time points t33 and t34 is the off period of the output transistor 101.

Accordingly, the second discharge controller 103d generates pulses in the second discharge control signal Sd during the period (between time points t33 and t34) after the on signal S1 is dropped to low level until it is raised to high level the next time.

More specifically, immediately before the on signal S1 is raised to high level, the second discharge controller 103d raises the second discharge control signal Sd to high level to keep it at high level for a predetermined on period T4 (e.g., 100 ns).

With this output discharge control, the discharge transistor M1 can be turned on momentarily every off period of the output transistor 101. It is thus possible to charge the capacitor C3 without fail and thereby prevent a boot fault.

<Overcurrent Protection Operation>

Figure 11:
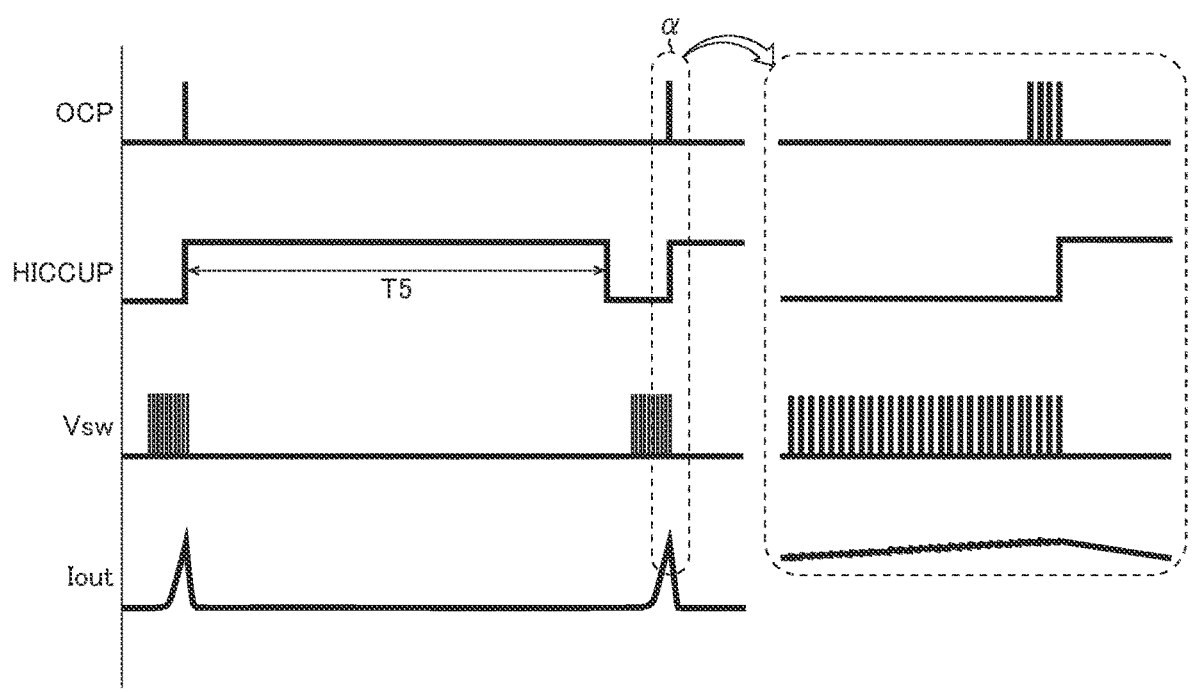
FIG. 11 is a timing chart showing one example of over-current protection operation.

FIG. 11 is a timing chart showing one example of overcurrent protection operation on occurrence of a ground short (a short circuit to a grounded terminal or a low-potential terminal comparable to it), depicting, from top down, an overcurrent protection signal OCP, a hiccup signal HICCUP, the switching voltage Vsw, and the output current Iout. In a righthand part of the diagram are shown the waveforms inside the broken-line frame a on an enlarged scale.

When the output terminal for the output voltage Vout suffers a ground short and the output current Iout goes into an overcurrent state, the overcurrent protection circuit 118 raises the overcurrent protection signal OCP to high level to forcibly turn off the output transistor 101, and thereby reduces the output current Iout.

However, because the above overcurrent protection operation is performed on a pulse-by-pulse basis, forcible halting and self-recovery of switching operation are repeated every switching period. Accordingly, however short the on period Ton of the output transistor 101 may be limited to be, as forcible halting and self-recovery of switching operation are repeated for a long period, the output transistor 101 generates a large amount of heat, and this may eventually trigger a shutdown by the temperature protection circuit 115.

To avoid that, the logic circuit 103 can, when overcurrent protection is evoked at a predetermined frequency, keep the hiccup signal HICCUP at high level for a predetermined cool-down period T5 (>switching period T (=1/fsw); e.g., 20 ms) to forcibly bring pin-1 (SW) into a high-impedance state and thereby bring the switching output stage into hiccup operation. With this overcurrent protection operation (ground-short protection operation), it is possible to prevent the output transistor 101 from generating heat, and it is thus possible to prevent a shutdown by the temperature protection circuit 115.

The predetermined frequency mentioned above can be, for example, such that, when the overcurrent protection signal OCP rises to high level four times in 16 counts, a transition is made to hiccup operation.

<Package and Printed Circuit Board>

Figure 12:
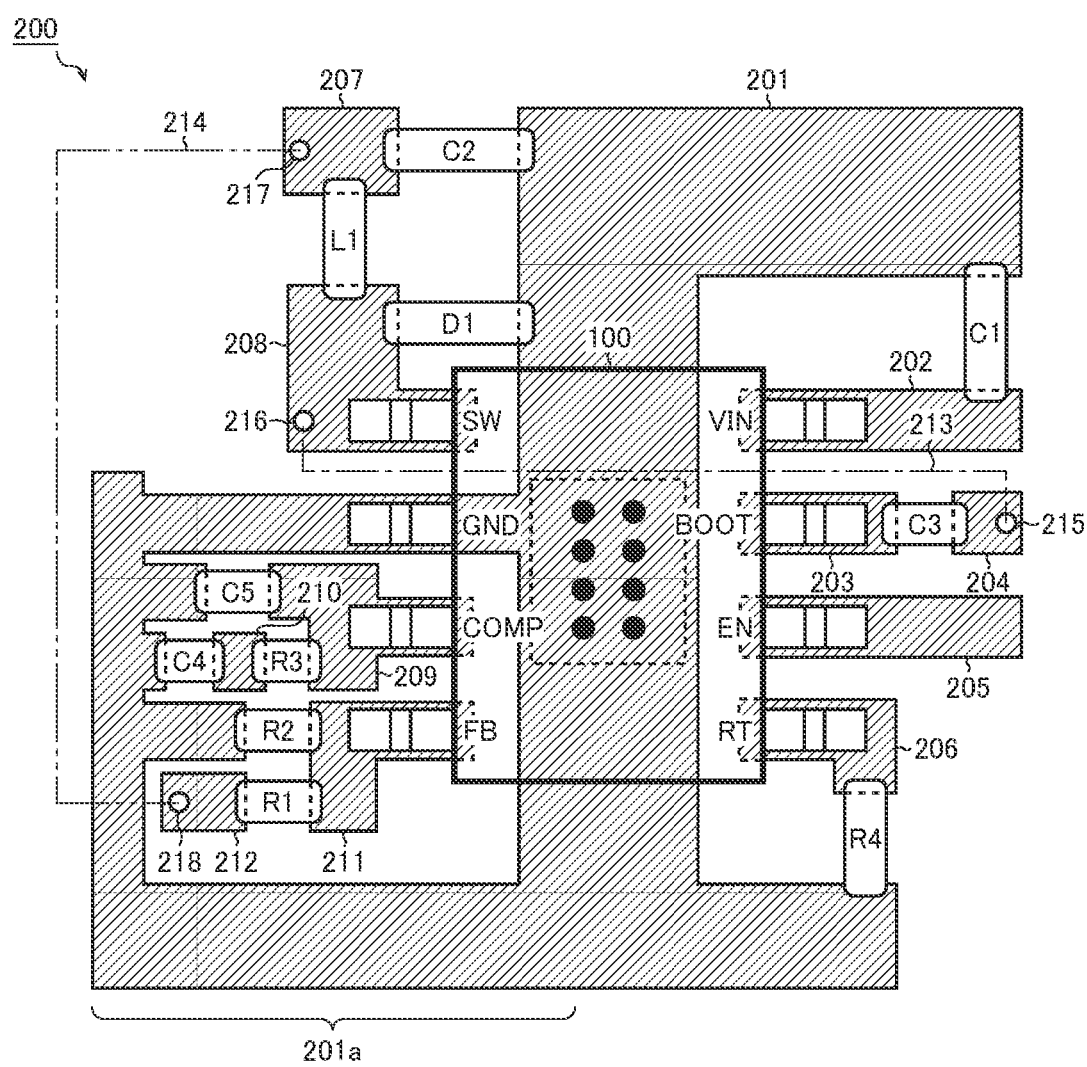
FIG. 12 is a diagram showing one example of the configuration of a semiconductor device and a printed circuit board on which it is mounted.

FIG. 12 is a diagram showing one example of the configuration of a semiconductor device and a printed circuit board on which it is mounted. The following description deals with the layouts of the semiconductor device 100 and the printed circuit hoard 200 respectively, with the top-bottom and left-right axes of the diagram taken as the top-bottom and left-right axes, respectively, of both the semiconductor device 100 and the printed circuit board 200.

The semiconductor device 100 of this configuration example employs as its package an SOP (small outline package) (or a TSOP [thin SOP] or TSSOP [thin shrink SOP]) having a total of eight pins laid out of it.

Along the left side of the package of the semiconductor device 100 are arranged, from top down, pin-1 (SW), pin-2 (GND), pin-3 (COMP), and pin-4 (FB). Along the right side of the package of the semiconductor device 100 are arranged, from bottom up, pin-5 (RT), pin-6 (EN), pin-7 (BOOT), and pin-8 (VIN). These eight pins are all bent midway. On the bottom face (the face facing the printed circuit board 200) of the package of the semiconductor device 100, a heatsink pad (indicated by a broken-line frame) is exposed.

On the other hand, on the top face of the printed circuit board 200, a plurality of wiring patterns 201 to 212 (indicated by hatched regions) are formed. Also on the bottom face (or in an inner wiring layer) of the printed circuit board 200, a plurality of wiring patterns 213 and 214 are formed.

The wiring pattern 201 is a broad wiring pattern that is connected to pin-2 (GND) and the heatsink pad of the semiconductor device 100, and the heatsink pad on the bottom face of the package is bonded to the wiring pattern 201 in a region of it directly under the semiconductor device 100. The wiring pattern 201 extends from its region directly under the semiconductor device 100 upward on the plane of illustration and then bends rightward on the plane of illustration. To the part extending upward on the plane of illustration, the anode of the diode D1 is connected near the semiconductor device 100, and the second terminal of the capacitor C2 is connected in the upper left corner. The diode D1 and the capacitor C2 are both arranged laterally (i.e., with their lengthwise direction aligned with the left-right axis of the illustration; the same is true with any element similarly described in the following description). To the bent part which extends from the extending part rightward in the illustration, in the lower right corner, the second terminal of the capacitor C1 is connected, which is arranged longitudinally (i.e., with its lengthwise direction aligned with the top-bottom axis of the illustration; the same is true with any element similarly described in the following description).

The wiring pattern 201 extends from its region directly under the semiconductor device 100 also downward on the plane of illustration and then branches rightward and leftward on the plane of illustration. To the branch part extending rightward on the plane of illustration, in the upper right corner, the second terminal of the resistor R4, which is arranged longitudinally, is connected. On the other hand, the branch part extending leftward then bends upward on the plane of illustration and then bends rightward on the plane of illustration, eventually forming a GND wiring loop 201a that connects via a region where pin-2 (GND) is connected to it to the region directly under the semiconductor device 100.

The wiring pattern 202 is a wiring pattern to which pin-8 (VIN) of the semiconductor device 100 is connected, and extends from the upper right corner of the semiconductor device 100 rightward on the plane of illustration. To the right end of the wiring pattern 202, the first terminal of the capacitor C1 is connected.

The wiring pattern 203 is a wiring pattern to which pin-7 (BOOT) of the semiconductor device 100 is connected, and is laid at the lower side of the wiring pattern 202, parallel to it. To the left end of the wiring pattern 203, the first terminal of the capacitor C3, which is arranged laterally, is connected.

The wiring pattern 204 is formed at the lower side of the wiring pattern 202, at the right side of the wiring pattern 203, with a predetermined interval left from the right end of the wiring pattern 203. To the left end of the wiring pattern 204, the second terminal of the capacitor C3 is connected.

The wiring pattern 205 is a wiring pattern to which pin-6 (EN) of the semiconductor device 100 is connected, and is laid at the lower side of the wiring patterns 203 an 204, parallel to them.

The wiring pattern 206 is a wiring pattern to which pin-5 (RT) of the semiconductor device 100 is connected, and extends from the lower right corner of the semiconductor device 100 rightward on the plane of illustration. The right end of the wiring pattern 206 bends downward on the plane of illustration, and to the extreme end of it, the first terminal of the resistor R4 is connected.

The wiring pattern 207 is formed at the left side of the wiring pattern 201, at the top side of the wiring pattern 208, with predetermined intervals left from the wiring patterns 201 and 208. To the right end of the wiring pattern 207, the first terminal of the capacitor C2 is connected. To the lower end of the wiring pattern 207, the second terminal of the inductor L1, which is arranged longitudinally, is connected.

The wiring pattern 208 is a wiring pattern to which pin-1 (SW) of the semiconductor device 100 is connected, and extends from the upper left corner of the semiconductor device 100 leftward on the plane of illustration. The left end of the wiring pattern 208 bents upward on the plane of illustration. To the extreme end of the bent part, the first terminal of the inductor L1 is connected. To the right end of the bent part, the cathode of the diode D1 is connected.

The wiring pattern 209 is a wiring pattern to which pin-3 (COMP) of the semiconductor device 100 is connected, and is laid in the closed space surrounded by the GND wiring loop 201a. The left end of the wiring pattern 209 is enlarged to expand along the top-bottom axis of the illustration, and to the expanded part, the respective first terminals of the capacitor C5 and the resistor R3, which are each arranged laterally, are connected. The second terminal of the capacitor C5 is connected to a protruding part that is extended from the CND wiring loop 201a toward the wiring pattern 209.

The wiring pattern 210 is formed at the left side of the wiring pattern 209 with predetermined intervals left between the wiring pattern 209 and the GND wiring loop 201a respectively. To the right end of the wiring pattern 210, the second terminal of the resistor R3 is connected. To the left end of the wiring pattern 210, the first terminal of the capacitor C4, which is arranged laterally, is connected. The second terminal of the capacitor C4 is connected to a protruding part that is extended from the GND wiring loop 201a toward the wiring pattern 210.

The wiring pattern 211 is a wiring pattern to which pin-4 (FB) of the semiconductor device 100 is connected, and is laid in the closed space surrounded by the GND wiring loop 201a. To the left end of the wiring pattern 211, the first terminal of the resistor R2, which is arranged laterally, is connected. The second terminal of the resistor R2 is connected to a protruding part that is extended from the GND wiring loop 201a toward the wiring pattern 211. The left end of the wiring pattern 211 is bent downward on the plane of illustration, and to the bent part, the second terminal of the resistor R1, which is arranged laterally, is connected.

The wiring pattern 212 is formed at the left side of the wiring pattern 211 with a predetermined interval left from the left end of the wiring pattern 211. To the right end of the wiring pattern 212, the first terminal of the resistor R1 is connected.

The wiring pattern 213 (dash-dot line) conducts via a through hole 215 to the wiring pattern 204, and also conducts via a through hole 216 to the wiring pattern 208. Thus, the wiring patterns 204 and 206 conduct to each other via the wiring pattern 213 and the through holes 215 and 216.

The wiring pattern 214 (dash-dot-dot line) conducts via a through hole 217 to the wiring pattern 207, and also conducts via a through hole 218 to the wiring pattern 212. Thus, the wiring patterns 207 and 212 conduct to each other via the wiring pattern 214 and the through holes 217 and 218.

Logic Circuit (Fourth Embodiment)

Figure 13:
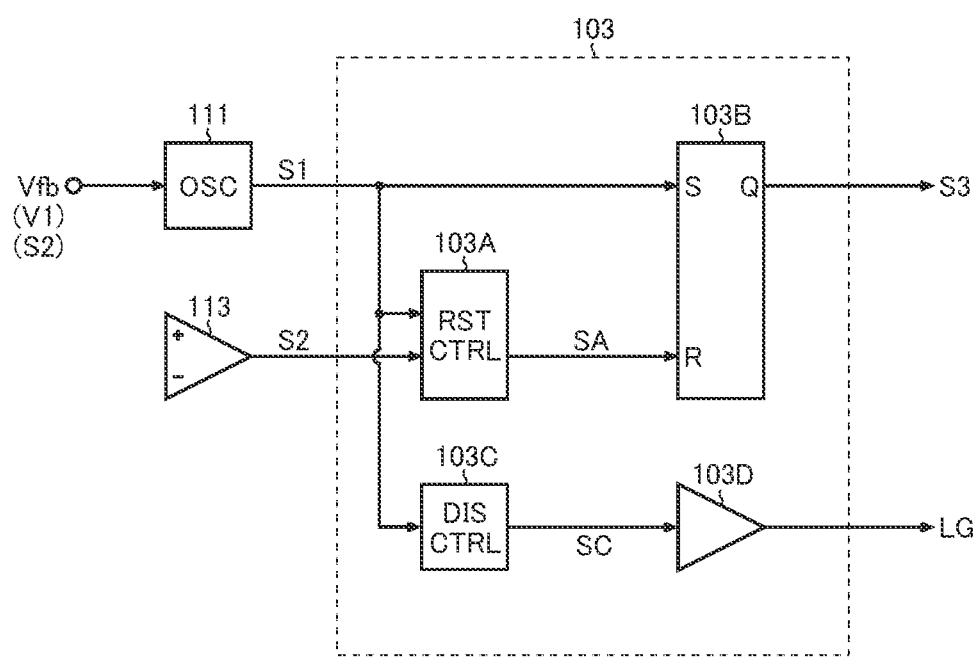
FIG. 13 is a diagram showing a configuration (a fourth embodiment) of a principal part of a logic circuit.

FIG. 13 is a diagram showing a configuration (fourth embodiment) of a principal part of the logic circuit 103. The logic circuit 103 of this embodiment includes, as functional blocks involved in the generation of the on/off control signal S3 and the gate signal LG, a reset controller 103A, an RS flip-flop 103B, a discharge controller 103C, and a gate signal driver 103D.

The reset controller 103A generates a one-shot pulse in the reset signal SA at the earlier of the time point that the on signal S1 falls from high level to low level and the time point that the off signal S2 rises from low level to high level.

The RS flip-flop 103B switches the logic level of the on/off control signal S3, which the RS flip-flop 103B outputs from its output terminal (Q), in accordance with the on signal S1 (i.e., a set signal), which is fed to the set terminal (S) of the RS flip-flop 103B, and the reset signal SA, which is fed to the reset terminal (R) of the RS flip-flop 103B. Specifically, the RS flip-flop 103B sets the on/off control signal S3 to high level (i.e., the logic level corresponding to an on state) when the on signal S1 rises, and resets the on/off control signal S3 to low level (the logic level corresponding to an off state) when the reset signal SA rises.

The discharge controller 103C receives the on signal S1 and generate pulses periodically in the discharge control signal SC so that the switching voltage Vsw is discharged every low-level period (off period) of the on signal S1.

The gate signal driver 103D drives the discharge transistor M1 in the discharge circuit 120 by generating the gate signal LG by increasing the current capacity of the discharge control signal SC fed from the discharge controller 103C.

The oscillation circuit 111 generates the on signal S1, which alternates between a high-level period (on period) and a low-level period (off period) periodically at a predetermined switching frequency fsw. The oscillation circuit 111 is particularly provided with a function of apparently achieving a 100% duty by skipping the low-level period (i.e. off period) of the on signal S1 when the output voltage Vout drops below the target value despite the output transistor 101 being kept on for the maximum on period Tmax (corresponding to the high-level period of the on signal S1; details will be given later). This maximum duty control will now be described in detail.

Figure 14:
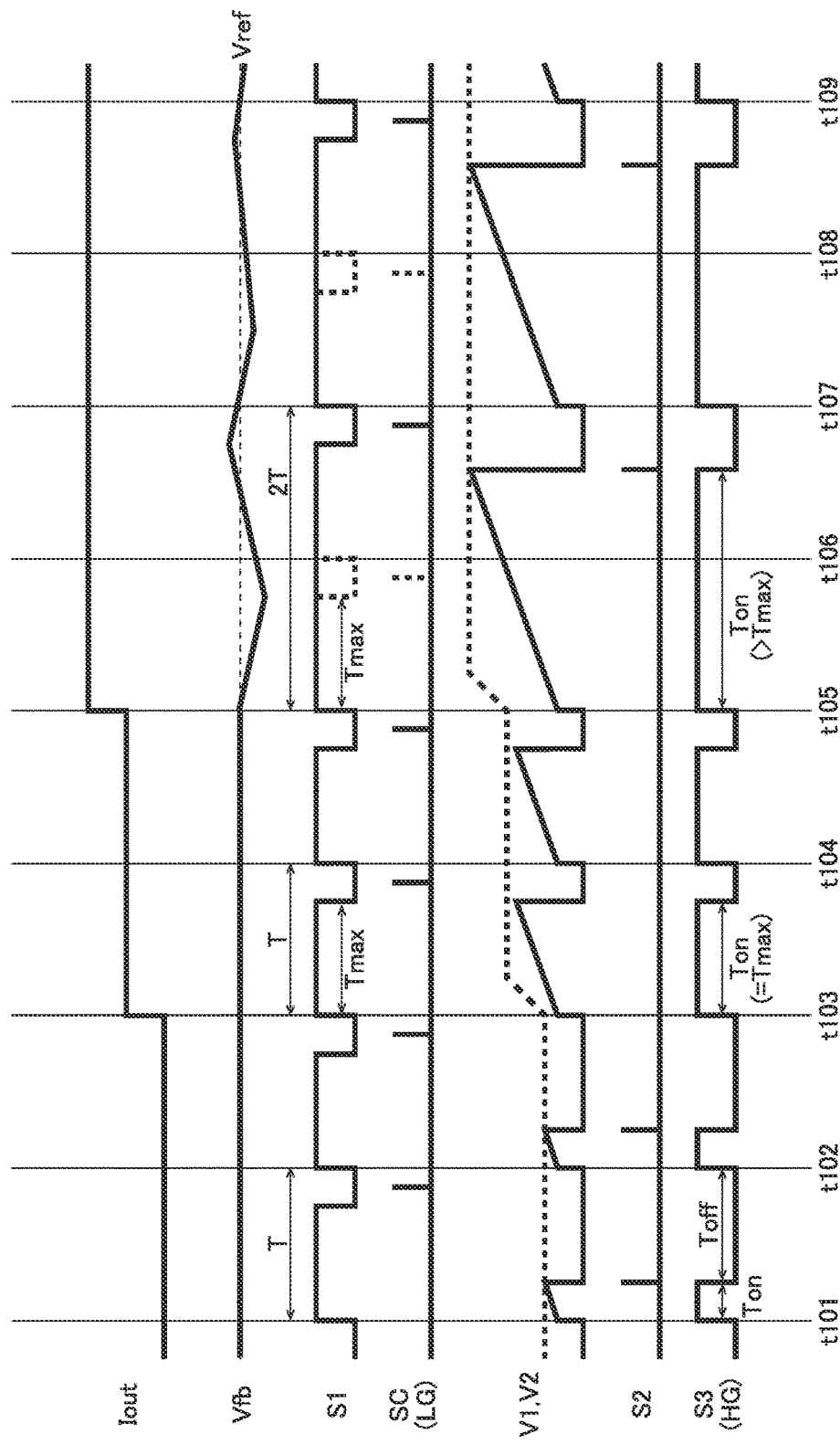
FIG. 14 is a timing chart showing one example of maximum duty control in the fourth embodiment.

FIG. 14 is a timing chart showing one example of maximum duty control in the fourth embodiment, depicting, from top down, the output current Iout to the load Z, the feedback voltage Vfb, the on signal S1, the discharge control signal SC (hence the gate signal LG), the error voltage V1 (broken line) and the slope voltage V2 (solid line), the off signal S2, and the on/off control signal S3 (hence the gate signal HG).

First, attention is paid to a first load region (between time points t101 and t103) where the output current Iout is the lowest. In the first load region, after the on signal S1 rises to high level, before it falls to low level, the error voltage V1 and the slope voltage V2 cross each other and the off signal S2 rises to high level. Accordingly, the on/off control signal S3 rises to high level when the on signal S1 rises, and falls to low level when the off signal S2 rises.

The interval after the on signal S1 rises until it rises the next time corresponds to the switching period T (=1/fsw) of the output transistor 101. The high-level period of the on/off control signal S3 corresponds to the on period Ton of the output transistor 101, and the low-level period of the off signal S2 corresponds to the off period Toff (=T−Ton) of the output transistor 101. Accordingly, in the first load region, the on-duty Don of the output transistor 101 (i.e., the proportion of the on period Ton in the switching period T) is PWM-controlled (controlled through pulse width modulation) so as to be higher the higher the error voltage V1 and is lower the lower the error voltage V1.

Next, attention is paid to a second load region (between time points t103 and t105) where the output current Iout is higher than in the first load region (between time points t101 and t103). In the second load region, as the output current Iout increases, the error voltage V1 is higher than in the first load region. As a result, after the on signal S1 rises to high level, even when it falls to low level, the error voltage V1 and the slope voltage V2 are yet to cross each other, and the off signal S2 has not yet risen to high level. Accordingly, the on/off control signal S3 rises to high level when the on signal S1 rises, and forcibly falls to low level when the on signal S1 falls.

Thus, the high-level period (on period) of the on signal S1 is set as the maximum on period Tmax of the output transistor 101. Accordingly, in the second load region, the on-duty Don of the output transistor 101 is limited to a predetermined maximum value (=Tmax/T).

Last, attention is paid to a third load region (between time points t105 and t109) where the output current Iout is still higher than in the second load region (between time points t103 and t105). In the third load region, as the output current Iout increases further, the error voltage V1 is higher than in the second load region. As a result, even when the output transistor 101 is kept on for the maximum on period Tmax, the output voltage Vout (hence the feedback voltage Vfb) drops below the target value.

To cope with that, when the output voltage Vout exhibits such a drop, the oscillation circuit 111 skips a low-level period (off period) of the on signal S1 (see the broken-line parts of the on signal S1).

For example, the oscillation circuit 111 can skip a low-level period (off period) of the on signal S1 when the feedback voltage Vfb is lower than a predetermined value. Or the oscillation circuit 111 can skip a low-level period (off period) of the on signal S1 when the error voltage V1 is higher than a predetermined value. Or the oscillation circuit 111 can skip a low-level period (off period) of the on signal S1 when the off signal S2 does not rise to high level even a predetermined length of time after the output transistor 101 is turned on.

A pulse in the on signal S1 can be skipped, for example, by temporarily halting the generation of pulses in the on signal S1, or by masking the on signal S1 (holding it at high level) with a logic gate.

Through the maximum on-duty control described above, the on signal S1 is apparently frequency-divided by a factor of n, and thus the switching period T is prolonged to n×T (in FIG. 14, n=2). Accordingly, the on period Ton of the output transistor 101 is extended beyond the maximum on period Tmax, and thus the on-duty Don of the output transistor 101 is apparently raised to 100% (see, for example, the period between time points t105 and t106 and the period between time points 1107 and t108). It is thus possible to enhance the load response characteristics and source response characteristics of the switching power supply 1, and thereby to minimize unintended variation of the output voltage Vout.

When a low-level period (off period) of the on signal S1 is skipped, the slope voltage generation circuit 112 may adjust the gradient of the slope voltage V2. For example, by making the gradient of the slope voltage V2 gentler, it is possible to delay the timing of its crossing with the error voltage V1 and thereby prolong the on period Ton of the output transistor 101. It is thus possible to more effectively suppress a drop in the output voltage Vout, and hence to prevent saturation of the error voltage V1 (i.e., a state where the output of the error amplifier circuit 110 is pegged at the maximum value).

With the switching power supply 1 of this embodiment, despite the use of an N-channel output transistor 101, which has a lower on-state resistance than a P-channel output transistor, it is theoretically possible to raise its on-duty Don up to approximately 100%. This is suitable in applications that handle high-voltages and high currents.

Driving the N-channel output transistor 101, however, requires a bootstrap circuit 107 for generating a boosted voltage Vb higher than the switching voltage Vsw, and also requires extra control (i.e., output discharge control) to prevent the maximum duty control described above from affecting the charging of the capacitor C3. This output discharge control will now be described in detail.

As mentioned previously, the discharge controller 103C generates pulses periodically in the discharge control signal SC (hence the gate signal LG) every low-level period (off period) of the on signal S1. Specifically, after the on signal S1 is dropped to low level, immediately before it is raised back to high level, the discharge controller 103C raises the discharge control signal SC (hence the gate signal LG) to keep it at high level for a predetermined on period (e.g., 100 ns).

With this output discharge control, the discharge transistor M1 can be turned on momentarily every off period of the output transistor 101, and it is thus possible to charge the capacitor C3 without fail and prevent a boot fault.

However, when a low-level period (off period) of the on signal S1 is skipped in the maximum duty control described previously, the discharge control signal SC (hence the gate signal LG) loses the occasion of rising to high level as indicated by broken lines in FIG. 14. If, as a result, the capacitor C3 is charged insufficiently, the output transistor 101 may not be turned on properly. As a configuration that solves this inconvenience, a fifth embodiment will be proposed below.

Logic Circuit (Fifth Embodiment)

Figure 15:
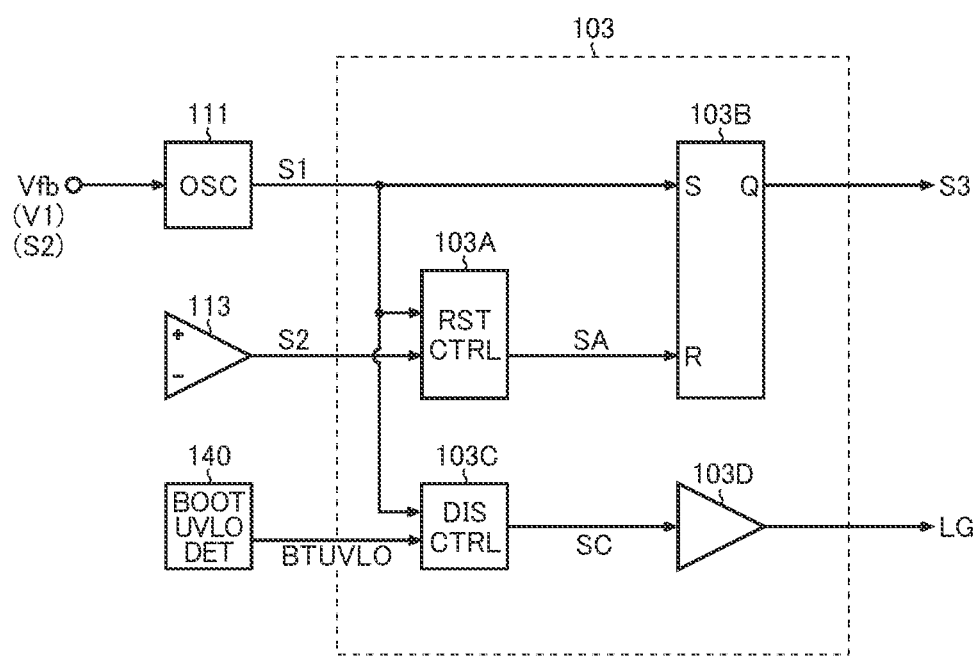
FIG. 15 is a diagram showing a configuration (a fifth embodiment) of a principal part of a logic circuit.

FIG. 15 is a diagram showing a configuration (fifth embodiment) of a principal part of the logic circuit 103. In the logic circuit 103 of this embodiment, the discharge controller 103C receives not only the on signal S1 but also the boat fault signal BTUVLO from a boot fault sense circuit 140, and generates the discharge control signal SC in accordance with both the on signal S1 and the boot fault signal BTUVLO.

Figure 16:
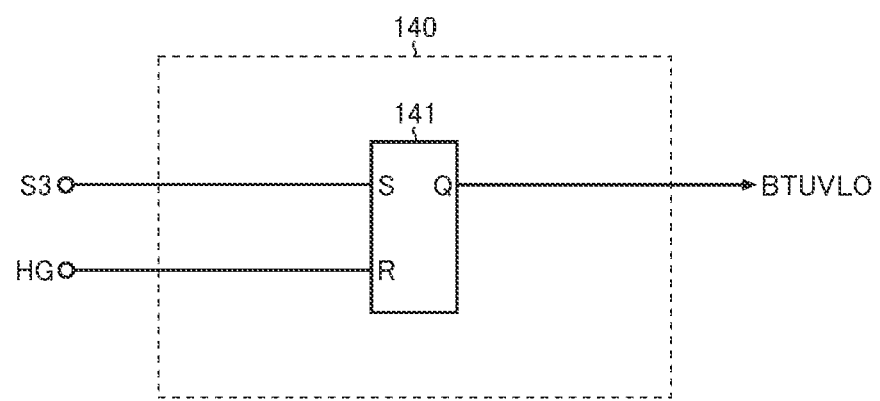
FIG. 16 is a diagram showing one example of the configuration of a boot fault sense circuit.

FIG. 16 is a diagram showing one configuration example of the boot fault sense circuit 140. The hoot fault sense circuit 140 is a functional bloc that generates the hoot fault signal BTUVLO by sensing whether the terminal-to-terminal voltage VC3 across the capacitor C3 exhibits a drop, and includes an RS flip-flop 141.

The RS flip-flop 141 switches the logic level of the hoot fault signal BTUVLO, which it outputs from its output terminal (Q), in accordance with the on/off control signal S3, which is fed to the set terminal (S) of the RS flip-flop 141, and the gate signal HG (corresponding to the switching driving signal in the switching output stage), which is fed to the reset terminal (R) of the RS flip-flop 141.

More specifically, the RS flip-flop 141 sets the boot fault signal BTUVLO to high level when the on/off control signal S3 rises, and resets the boot fault signal BTUVLO to low level when the gate signal HG rises.

Accordingly, when the terminal-to-terminal voltage VC3 across the capacitor C3 is sufficiently high such that, after the on/off control signal S3 rises to high level, the gate signal HG too rises to high level properly, the boot fault signal BTUVLO rises to high level and then falls back to low level. That is, periodic pulses appear in the boot fault signal BTUVLO.

By contrast, when the terminal-to-terminal voltage VC3 across the capacitor C3 is abnormally low such that, even after the on/off control signal S3 rises to high level, the gate signal HG does not rise to high level properly, the boot fault signal BTUVLO, once it rises to high level, does not fall back to low level but remains at high level. That is, no periodic pulses appear any longer in the boot fault signal BTUVLO.

As described above, the boot fault sense circuit 140 of this configuration example generates the boot fault signal BTUVLO by sensing, with the RS flip-flop 141, the gate signal HG not turning to high level properly after the off signal S2 having turned to high level. This eliminates the need to use a comparator with a large circuit scale, and thus helps achieve size reduction in the boot fault sense circuit 140 (hence the switching power supply 1).

Incidentally, in a case where a given pulse width needs to be secured in the boot fault signal BTUVLO, for example, the gate signal HG can be fed to the reset terminal (R) of the RS flip-flop 141 not directly but after being given a predetermined delay with a delay circuit.

Figure 17:
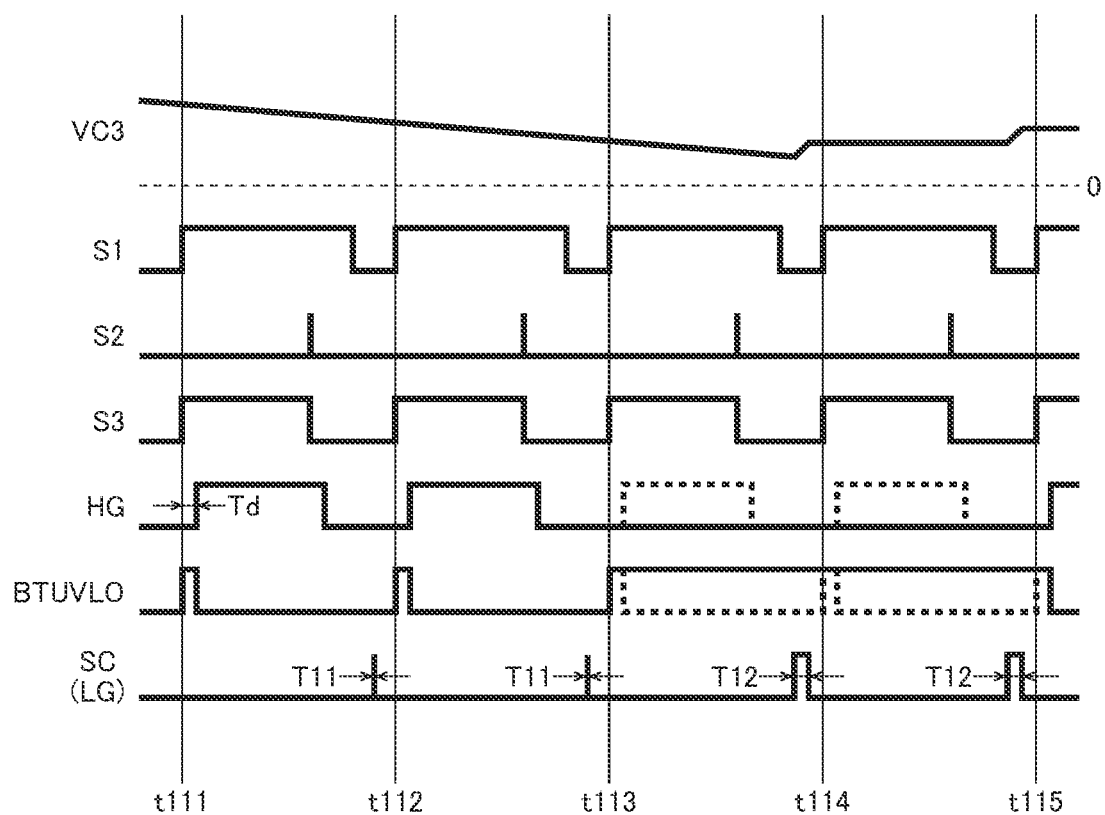
FIG. 17 is a timing chart showing one example of output discharge control in the fifth embodiment.

FIG. 17 is a timing chart showing one example of output discharge control in the second embodiment, depicting, from top down, the terminal-to-terminal voltage VC3 (=Vb−Vsw) across the capacitor C3, the on signal S1, the off signal S2, the on/off control signal S3, the gate signal HG, the boot fault signal BTUVLO, and the discharge control signal SC (hence the gate signal LG).

It is assumed that, before time point t113, the terminal-to-terminal voltage VC3 is sufficiently high. In this case, when the on signal S1 rises and as a result the on/off control signal S3 rises to high level, a predetermined delay time Td (a signal delay time in the driver circuit 102 or a signal delay time intentionally produced with a delay circuit) thereafter, the gate signal HG rises to high level properly. Accordingly, the boot fault signal BTUVLO is set to high level when the on/off control signal S3 rises, and is reset to low level when the gate signal HG rises. Thus, the boot fault signal BTUVLO comes into a state where periodic pulses appear in it (i.e., a state corresponding to no fault being sensed).

The discharge controller 103C raises the discharge control signal SC (hence the gate signal LG) to high level every low-level period (off period) of the on signal S1. At that time, if the boot fault signal BTUVLO is not kept at high level, the discharge control signal SC (hence the gate signal LG) is kept at high level for the on period T11 (e.g., 100 ns).

With this output discharge control, the discharge transistor M1 is turned on periodically, and it is thus possible to charge the capacitor C3 without fail and prevent a boot fault.

By contrast, if, after time point t113, some fault causes a drop in the terminal-to-terminal voltage VC3, even when the on signal S1 rises and as a result the on/off control signal S3 rises to high level, the gate signal HG does not rise to high level properly (see the broken-line parts of the gate signal HG). Accordingly, the boot fault signal BTUVLO is set to high level when the on/off control signal S3 rises but is not reset to low level thereafter and is instead kept at high level. Thus, the boot fault signal BTUVLO comes into a state (a state corresponding to a fault being sensed) where no periodic pulses appear in it (see the broken-line parts of the boot fault signal BTUVLO).

At that time, in response to the boot fault signal BTUVLO being kept at high level, the discharge controller 103C, every low-level period (off period) of the on signal S1, raises the discharge control signal SC (hence the gate signal LG) to high level to keep it at high level for an on period T12 (e.g., 500 ns) longer than the previous on period T11.

With this output discharge control, it is possible to keep the discharge transistor M1 on longer than when no fault is being sensed, and it is thus possible to charge the capacitor C3 sufficiently and eliminate a boot fault promptly.

While FIG. 17 shows a configuration where, when a boot fault is sensed, the discharge control signal SC (hence the gate signal LG) is pulse-driven so that the discharge transistor M1 is turned on and off periodically, a configuration is also possible where, for example, while the boot fault signal BTUVLO is kept at high level, the discharge control signal SC (hence the gate signal LG) is kept at high level so that the discharge transistor M1 is kept on continuously.

While FIG. 17 deals with an example where output discharge control with no boot fault being sensed (the on period T11) and output discharge control with a boot fault being sensed (the on period T12) are both performed, they may each be performed separately. For example, output discharge control may not be performed when no fault is being sensed and be performed only when a fault is being sensed.

In a case where, when a boot fault is sensed, the discharge control signal SC (hence the gate signal LG) is pulse-driven so that the discharge transistor M1 is turned on and off periodically, if the bootstrap circuit 107 has a sufficient charge current capacity, it is possible to eliminate a boot fault by turning on the discharge transistor M1 only once (or a few tunes).

On the other hand, if the bootstrap circuit 107 has a low charge current capacity and the discharge transistor M1 has to be turned on a number of times, preferably, the reference voltage for the bootstrap circuit 107 is switched to a higher voltage so as to temporarily raise the charge current capacity of the bootstrap circuit 107. A reference voltage switching mechanism that so operates will now be described in detail.

Figure 18:
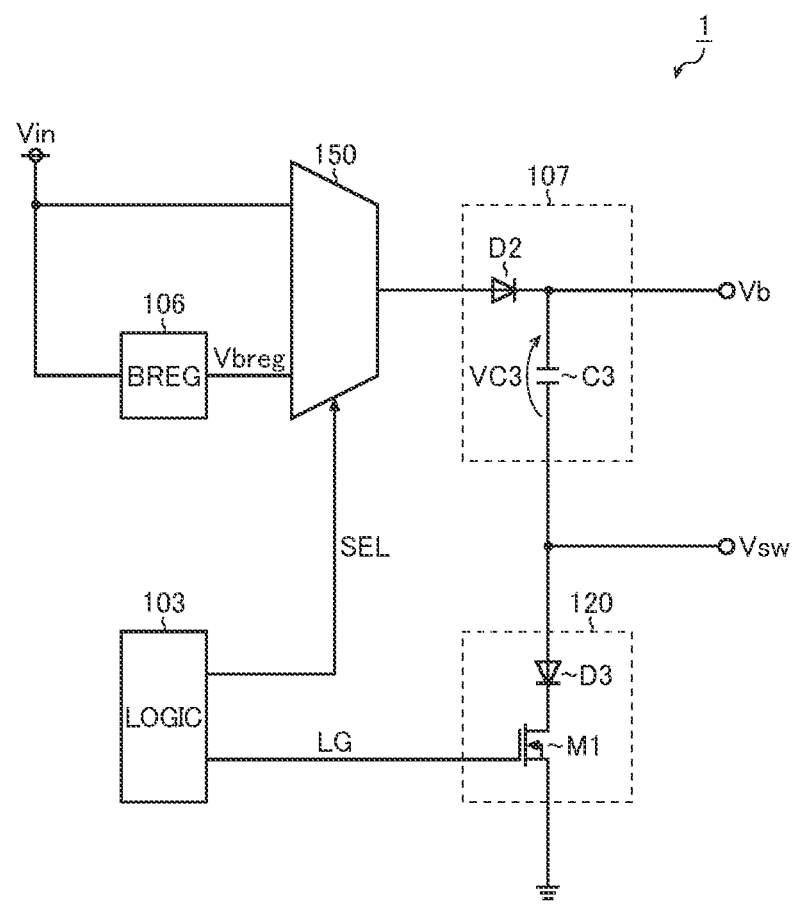
FIG. 18 is a diagram showing one example of a reference voltage switching mechanism.

FIG. 18 is a diagram showing one configuration example of a reference voltage switching mechanism for coping with a boot fault being sensed. As shown there, the switching power supply 1 of this configuration example includes a selector 150 for choosing, as the reference voltage to be fed to the anode of the diode D2 provided in the bootstrap circuit 107, either the third constant voltage Vbreg or the input voltage Vin.

The selector 150 chooses, in accordance with a switching signal SEL fed from the logic circuit 103, the third constant voltage Vbreg when no boot fault is being sensed or the input voltage Vin (>Vbreg) when a boot fault is being sensed.

Introducing the reference voltage switching mechanism described above helps increase the charge current capacity of the bootstrap circuit 107 on sensing a boot fault. It is thus possible to reduce the number of times that the discharge transistor M1 has to be turned on to eliminate the boot fault.

<Overview>

To follow is an overview of the various embodiments disclosed herein.

According to one aspect of what is disclosed herein, a switching power supply includes: a switching output stage configured to generate an output voltage by rectifying and smoothing a switching voltage that is pulse-driven as an output transistor is turned on and off; and a discharge circuit configured to discharge the output voltage when the output voltage remains above a target value for a predetermined time. (A first configuration.)

In the switching power supply of the first configuration described above, the discharge circuit may include a discharge transistor connected between an application terminal for the switching voltage and a grounded terminal. The discharge transistor may be configured to be kept on continuously or be turned on and off periodically as the output voltage is discharged. (A second configuration.)

In the switching power supply of the second configuration described above, the discharge transistor may be configured to be turned off when the output voltage reaches a power-short sense threshold voltage. (A third configuration.)

The switching power supply of any of the first to third configurations described above may further include: an error amplifier circuit configured to receive a feedback voltage commensurate with the output voltage to generate an error voltage; an oscillation circuit configured to generate an on signal at a predetermined switching frequency; a slope voltage generation circuit configured to generate a slope voltage in synchronization with the on signal; a comparison circuit configured to compare the error voltage with the slope voltage to generate an off signal; a logic circuit configured to generate an on/off control signal in accordance with the on signal and the off signal; and a driver circuit configured to drive the switching output stage in accordance with the on/off control signal. (A fourth configuration.)

In the switching power supply of the fourth configuration described above, the logic circuit may be configured to control the discharge circuit such that the discharge circuit discharges the output voltage when the off signal remains for the predetermined time at a level corresponding to an off state. (A fifth configuration.)

The switching power supply of the fourth or fifth configuration described above may further include: a soft-start voltage generation circuit configured to generate a soft-start voltage that rises with a predetermined gradient. The error amplifier circuit may be configured to generate the error voltage in accordance with the difference of the lower of a predetermined reference voltage and the soft-start voltage as compared with the feedback voltage. The logic circuit may be configured to control the discharge circuit such that the discharge circuit does not discharge the Output voltage until the soft-start voltage reaches the reference voltage or a value close to it. (A sixth configuration.)

The switching power supply of any of the fourth to sixth configurations described above may further include: a bootstrap circuit configured to generate a boosted voltage by adding up the switching voltage and the terminal-to-terminal voltage across a boot capacitor to feed the boosted voltage to the driver circuit. (A seventh configuration.)

The switching power supply of the seventh configuration described above may further include: a fault sense circuit configured to sense a drop in the terminal-to-terminal voltage to generate a fault signal. The logic circuit may be configured to control the discharge circuit such that the discharge circuit turns on a discharge transistor connected between the application terminal for the switching voltage and the grounded terminal when the fault signal remains for the predetermined time at a logic level corresponding to a fault state. (An eighth configuration.)

In the switching power supply of the seventh or eighth configuration described above, the logic circuit may be configured to control the discharge circuit such that the discharge circuit momentarily turns on a discharge transistor connected between the application terminal for the switching voltage and the grounded terminal every off period of the output transistor. (A ninth configuration.)

The switching power supply of any of the fourth to ninth configurations described above may further include: an overcurrent protection circuit configured to sense an overcurrent in the switching output stage to repeat forcible halting and self-recovery of the switching output stage every switching period. The logic circuit may be configured to switch the switching output stage into hiccup operation when overcurrent protection is evoked at a predetermined frequency. (A tenth configuration.)

According to another aspect of what is disclosed herein, a switching power supply includes: a switching output stage configured to generate an output voltage by rectifying and smoothing a switching voltage that is pulse-driven as an output transistor is turned on and off; an oscillation circuit configured to generate an on signal that alternates between an on period and an off period at a predetermined switching frequency; and a logic circuit configured to set the on period of the on signal as the maximum on period of the output transistor. The oscillation circuit may be configured to skip the off period of the on signal when, despite the output transistor being kept on for the maximum on period, the output voltage drops below a target value. (An eleventh configuration.)

The switching power supply of the eleventh configuration described above may further include: an error amplifier circuit configured to receive a feedback voltage commensurate with the output voltage to generate an error voltage; a slope voltage generation circuit configured to generate a slope voltage in synchronization with the on signal; a comparison circuit configured to compare the error voltage with the slope voltage to generate an off signal; and a driver circuit configured to generate a switching driving signal in accordance with the on/off control signal. The logic circuit may be configured to generate the on/off control signal in accordance with the on signal and the off signal. (A twelfth configuration.)

In the switching power supply of the twelfth configuration described above, the oscillation circuit may be configured to skip the off period of the on signal when the feedback voltage is lower than a predetermined value, or when the error voltage is higher than a predetermined value, or when the logic level of the off signal remains unchanged for a predetermined time after the output transistor is turned on. (A thirteenth configuration.)

In the switching power supply of the twelfth or thirteenth configuration described above, the slope voltage generation circuit may be configured to adjust the gradient of the slope voltage when the off period of the on signal is skipped. (A fourteenth configuration.)

The switching power supply of any the twelfth to fourteenth configurations described above may further include: a bootstrap circuit configured to generate a boosted voltage by adding up the switching voltage and the terminal-to-terminal voltage across a boot capacitor to feed the boosted voltage to the driver circuit. (A fifteenth configuration.)

The switching power supply of the fifteenth configuration described above may further include: a discharge circuit configured to discharge the switching voltage every off period of the on signal. (A sixteenth configuration.)

The switching power supply of the fifteenth or sixteenth configuration described above may further include: a fault sense circuit configured to sense a drop in the terminal-to-terminal voltage to generate a fault signal. (A seventeenth configuration.)

In the switching power supply of the seventeenth configuration described above, the fault sense circuit may be configured to generate the fault signal by sensing, after the on/off control signal turning to a logic level corresponding to an on state, the switching driving signal not turning to a logic level corresponding to the on state. (An eighteenth configuration.)

The switching power supply of the seventeenth or eighteenth configuration described above may further include: a discharge circuit configured to discharge the switching voltage in accordance with the fault signal. (A nineteenth configuration.)

The switching power supply of the nineteenth configuration described above may further include: a selector configured to switch a reference voltage for the bootstrap circuit to a higher voltage when the switching voltage is discharged. (A twentieth configuration.)

<Other Modifications>

The various technical features disclosed herein may be implemented in any other manners than in the embodiments described above, and allow for any modifications made within the spirit of their technical ingenuity. For example, any two or more of the various embodiments may be implemented in any viable combinations. That is, the embodiments described above should be considered to be in every aspect illustrative and not restrictive, and the technical scope of the present invention should be understood to be defined not by the description of the embodiments described above but by the appended claims and to encompass any modifications made in a sense and scope equivalent to the claims.

INDUSTRIAL APPLICABILITY

The invention disclosed herein find applications in OA (office automation) appliances, secondary-side power supplies, adaptor appliances, communication appliances, and the like.

REFERENCE SIGNS LIST 1 switching power supply
100 semiconductor device (switching power IC)
101 output transistor (N-channel MOS field-effect transistor)
102 driver circuit
103 logic circuit
103a discharge controller
103b gate signal driver
103c OR operator
103d second discharge controller
103e OR operator
103A reset controller
103B RS flip-flop
103C discharge controller
103D gate signal driver
104 first regulator circuit
105 second regulator circuit
106 third regulator circuit
107 bootstrap circuit
108 reference voltage generation circuit
109 soft-start voltage generation circuit
110 error amplifier circuit
111 oscillation circuit
112 slope voltage generation circuit
113 comparison circuit
114 undervoltage protection circuit
115 temperature protection circuit
116 short-circuit protection circuit
117 overvoltage protection circuit
118 overcurrent protection circuit
119 soft-start oscillation circuit
120 discharge circuit
130 boot fault sense circuit
131, 132 P-Channel MOS field-effect transistor
133, 134 N-channel MOS field-effect transistor
135, 136 resistor
137 Schmitt buffer
140 boot fault sense circuit
141 RS flip-flop
150 selector 200 printed circuit board
201-214 wiring pattern
201a GND wiring loop
215-218 through hole
C1-C5 capacitor
D1-D3 diode
L1 inductor
M1 discharge transistor
R1-R6 resistor

The invention claimed is:

1. A switching power supply comprising:
a switching output stage configured to generate an output voltage by rectifying and smoothing a switching voltage that is pulse-driven as an output transistor is turned on and off;
a discharge circuit configured to discharge the output voltage when the output voltage remains above a target value for a predetermined time;
an error amplifier circuit configured to receive a feedback voltage commensurate with the output voltage to generate an error voltage;
an oscillation circuit configured to generate an on signal at a predetermined switching frequency;
a slope voltage generation circuit configured to generate a slope voltage in synchronization with the on signal;
a comparison circuit configured to compare the error voltage with the slope voltage to generate an off signal;
a logic circuit configured to generate an on/off control signal in accordance with the on signal and the off signal; and
a driver circuit configured to drive the switching output stage in accordance with the on/off control signal, wherein
the logic circuit is configured to control the discharge circuit such that the discharge circuit discharges the output voltage when the off signal remains for the predetermined time at a level corresponding to an off state.

2. The switching power supply according to claim 1, wherein
the discharge circuit includes a discharge transistor connected between an application terminal for the switching voltage and a grounded terminal, and
the discharge transistor is configured to be kept on continuously or be turned on and off periodically as the output voltage is discharged.

3. The switching power supply according to claim 2, wherein
the discharge transistor is configured to be turned off when the output voltage reaches a power-short sense threshold voltage.

4. The switching power supply according to claim 1, further comprising:
a soft-start voltage generation circuit configured to generate a soft-start voltage that rises with a predetermined gradient,
wherein
the error amplifier circuit is configured to generate the error voltage in accordance with a difference of a lower of a predetermined reference voltage and the soft-start voltage as compared with the feedback voltage, and
the logic circuit is configured to control the discharge circuit such that the discharge circuit does not discharge the output voltage until the soft-start voltage reaches the reference voltage or a value close thereto.

5. The switching power supply according to claim 1, further comprising:

a bootstrap circuit configured to generate a boosted voltage by adding up the switching voltage and a terminal-to-terminal voltage across a boot capacitor to feed the boosted voltage to the driver circuit.

6. The switching power supply according to claim 5, further comprising:
a fault sense circuit configured to sense a drop in the terminal-to-terminal voltage to generate a fault signal, wherein
the logic circuit is configured to control the discharge circuit such that the discharge circuit turns on a discharge transistor connected between an application terminal for the switching voltage and a grounded terminal when the fault signal remains for the predetermined time at a logic level corresponding to a fault state.

7. The switching power supply according to claim 5, wherein
the logic circuit is configured to control the discharge circuit such that the discharge circuit momentarily turns on a discharge transistor connected between an application terminal for the switching voltage and a grounded terminal every off period of the output transistor.

8. The switching power supply according to claim 1, further comprising:
an overcurrent protection circuit configured to sense an overcurrent in the switching output stage to repeat forcible halting and self-recovery of the switching output stage every switching period,
wherein
the logic circuit is configured to switch the switching output stage into hiccup operation when overcurrent protection is evoked at a predetermined frequency.

9. A switching power supply comprising:
a switching output stage configured to generate an output voltage by rectifying and smoothing a switching voltage that is pulse-driven as an output transistor is turned on and off;
a discharge circuit configured to discharge the output voltage when the output voltage remains above a target value for a predetermined time;
an error amplifier circuit configured to receive a feedback voltage commensurate with the output voltage to generate an error voltage;
an oscillation circuit configured to generate an on signal at a predetermined switching frequency;
a slope voltage generation circuit configured to generate a slope voltage in synchronization with the on signal;
a comparison circuit configured to compare the error voltage with the slope voltage to generate an off signal;
a logic circuit configured to generate an on/off control signal in accordance with the on signal and the off signal;
a driver circuit configured to drive the switching output stage in accordance with the on/off control signal;
a bootstrap circuit configured to generate a boosted voltage by adding up the switching voltage and a terminal-to-terminal voltage across a boot capacitor to feed the boosted voltage to the driver circuit, and
a fault sense circuit configured to sense a drop in the terminal-to-terminal voltage to generate a fault signal, wherein
the logic circuit is configured to control the discharge circuit such that the discharge circuit turns on a discharge transistor connected between an application terminal for the switching voltage and a grounded terminal when the fault signal remains for the predetermined time at a logic level corresponding to a fault state.

10. A switching power supply comprising:
a switching output stage configured to generate an output voltage by rectifying and smoothing a switching voltage that is pulse-driven as an output transistor is turned on and off;
a discharge circuit configured to discharge the output voltage when the output voltage remains above a target value for a predetermined time;
an error amplifier circuit configured to receive a feedback voltage commensurate with the output voltage to generate an error voltage;
an oscillation circuit configured to generate an on signal at a predetermined switching frequency;
a slope voltage generation circuit configured to generate a slope voltage in synchronization with the on signal;
a comparison circuit configured to compare the error voltage with the slope voltage to generate an off signal;
a logic circuit configured to generate an on/off control signal in accordance with the on signal and the off signal;
a driver circuit configured to drive the switching output stage in accordance with the on/off control signal, and
a bootstrap circuit configured to generate a boosted voltage by adding up the switching voltage and a terminal-to-terminal voltage across a boot capacitor to feed the boosted voltage to the driver circuit, wherein
the logic circuit is configured to control the discharge circuit such that the discharge circuit momentarily turns on a discharge transistor connected between an application terminal for the switching voltage and a grounded terminal every off period of the output transistor.

* * * * *